US012693428B2

(12) United States Patent
Shrestha et al.

(10) Patent No.: US 12,693,428 B2
(45) Date of Patent: Jul. 28, 2026

(54) GNSS VALIDITY REPORT IN IoT NTN

(71) Applicant: QUALCOMM Incorporated, San Diego, CA (US)

(72) Inventors: Bharat Shrestha, San Diego, CA (US); Mungal Singh Dhanda, Slough (GB); Ayan Sengupta, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 957 days.

(21) Appl. No.: 18/046,892

(22) Filed: Oct. 14, 2022

(65) Prior Publication Data

US 2023/0213661 A1     Jul. 6, 2023

Related U.S. Application Data

(60) Provisional application No. 63/266,454, filed on Jan. 5, 2022.

(51) Int. Cl.
| | |
|---|---|
| *G01S 19/24* | (2010.01) |
| *H04W 76/20* | (2018.01) |
| *H04W 76/30* | (2018.01) |
| *H04W 84/06* | (2009.01) |

(52) U.S. Cl.
CPC ............. *G01S 19/24* (2013.01); *H04W 76/20* (2018.02); *H04W 76/30* (2018.02); *H04W 84/06* (2013.01)

(58) Field of Classification Search
CPC ........ G01S 19/24; G01S 19/21; G01S 19/396; H04W 76/20; H04W 76/30; H04W 84/06; H04W 76/27; H04B 7/18513
See application file for complete search history.

(56) References Cited

U.S. PATENT DOCUMENTS

| | | | |
|---|---|---|---|
| 2023/0099762 A1* | 3/2023 | Khoshkholgh Dashtaki ............... H04W 56/001 370/350 |
| 2023/0337165 A1* | 10/2023 | Hu ....................... H04W 56/004 |
| 2023/0344508 A1* | 10/2023 | Tseng ............... H04W 56/0045 |
| 2023/0388952 A1* | 11/2023 | Khoshkholgh Dashtaki ............... H04B 7/18513 |

(Continued)

OTHER PUBLICATIONS

Rahman, Imadur, et al. "5G evolution toward 5G advanced: An overview of 3GPP releases 17 and 18." Ericsson Technology Review 2021.14 (2021): 2-12. (Year: 2021).*

(Continued)

*Primary Examiner* — Sharad Rampuria
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for GNSS validity reporting in NTNs. A UE may transmit, to a network entity, a report of a validity duration for GNSS tracking information. The GNSS tracking information may be associated with an NTN including the UE and the network entity. The report may include an indication of a remaining time period of the validity duration based on a threshold. The UE may switch to an RRC idle mode based on the report of the validity duration. The RRC idle mode may be switched to after an expiration of the remaining time period of the validity duration or based on an RRC release message received from the network entity.

29 Claims, 12 Drawing Sheets

400

(56) References Cited

U.S. PATENT DOCUMENTS

2025/0007666 A1 *    1/2025    Tsai .................. H04W 74/0836

OTHER PUBLICATIONS

Edjekouane, Idir, et al. "User Equivalent Range Error and Position-ing Accuracy Analysis for ToA-Based Techniques Using PRS and SSB in 5G/6G NTN." IEEE Open Journal of the Communications Society (2025). (Year: 2025).*

CMCC: "Enhancements on Time and Frequency Synchronization for IoT NTN", 3GPP TSG RAN WG1 #107-e, R1-2111633, 3rd Generation Partnership Project, Mobile Competence Centre, 650, Route Des Lucioles, F-06921 Sophia-Antipolis Cedex, France , vol. RAN WG1, No. e-Meeting, Nov. 11, 2021-Nov. 19, 2021, 6 Pages, Nov. 5, 2021, XP052074995, sections 2.1.2, 2.2, and 3.

International Search Report and Written Opinion—PCT/US2022/048734—ISA/EPO—Feb. 24, 2023.

Mediatek: "10.4.3 NB-IoT/eMTC Support for Non-terrestrial Net-works (NTN)", 3GPP TSG RAN meeting #94-e, RP-213472 (RP-213349), 3rd Generation Partnership Project (3GPP), Mobile Com-petence Centre, 650, Route Des Lucioles, F-06921 Sophia-Antipolis Cedex, France vol. TSG RAN, No. Electronic Meeting, Dec. 6, 2021-Dec. 17, 2021, 17 Pages, Dec. 2, 2021, XP052086072, Section 2.1.1.

Moderator (Mediatek): "Summary #5 of AI 8.15.1 Enhancements to Time and Frequency Synchronization" , 3GPP TSG RAN WG1 Meeting #106bis-e, R1-2110645, 3rd Generation Partnership Proj-ect (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, 86 Pages, Oct. 20, 2021, XP052062139, sections 2.4.2 and 2.5.2 to 3.2.

* cited by examiner

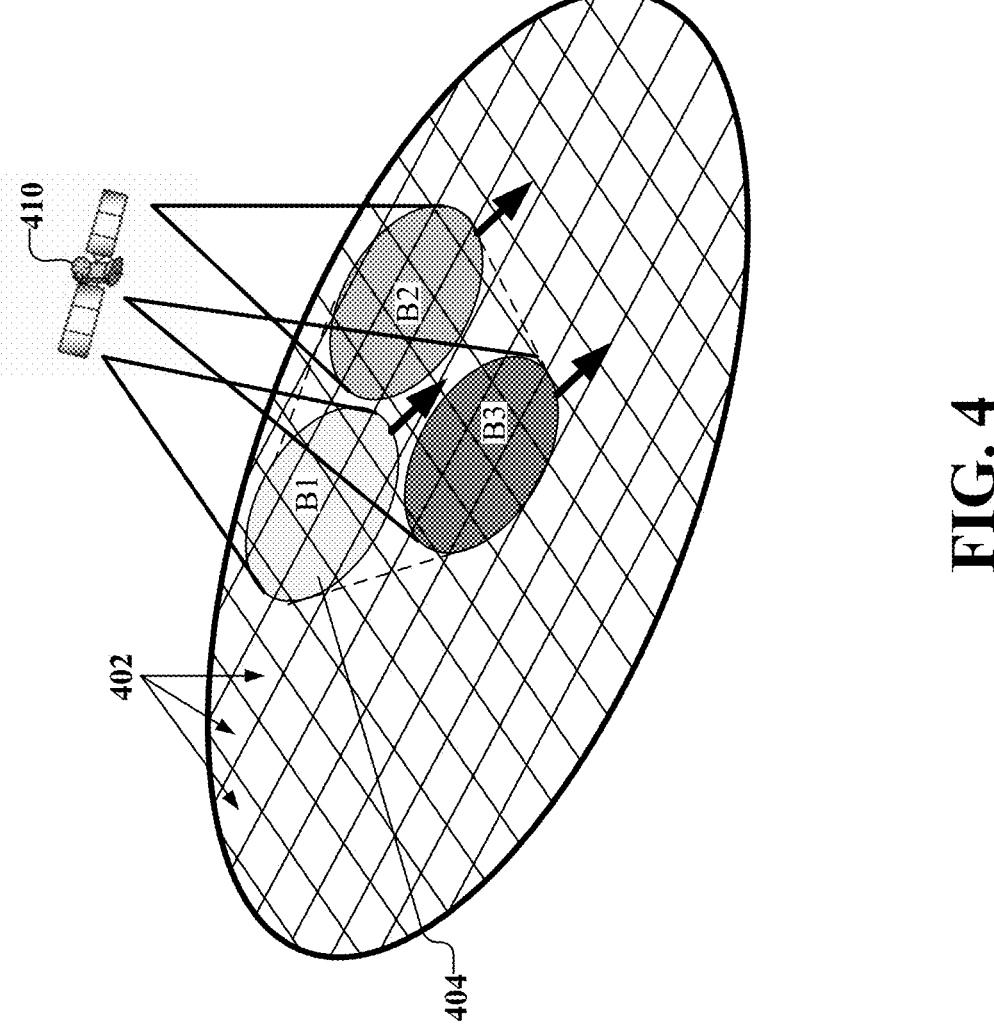
FIG. 4

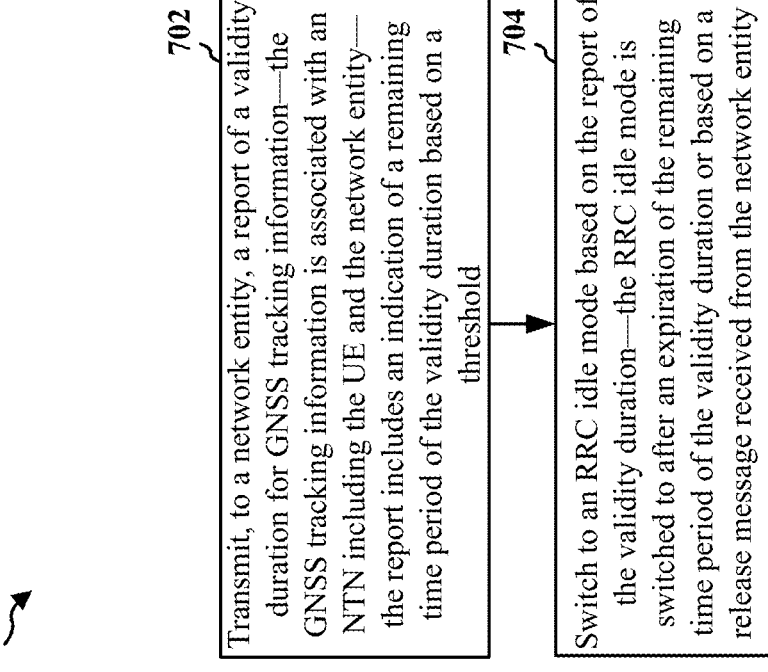

702

Transmit, to a network entity, a report of a validity duration for GNSS tracking information—the GNSS tracking information is associated with an NTN including the UE and the network entity—the report includes an indication of a remaining time period of the validity duration based on a threshold

704

Switch to an RRC idle mode based on the report of the validity duration—the RRC idle mode is switched to after an expiration of the remaining time period of the validity duration or based on a release message received from the network entity

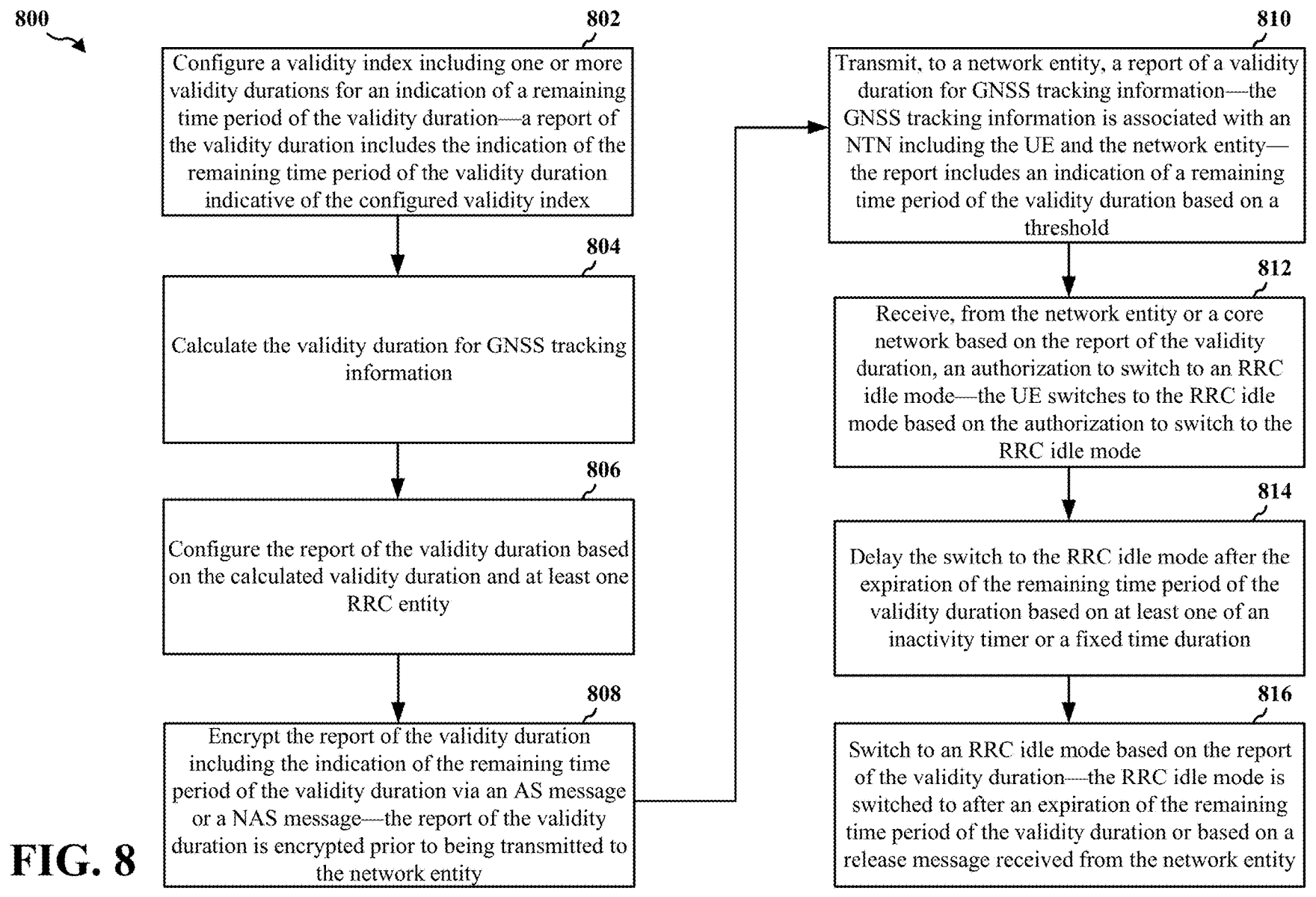

Configure a validity index including one or more validity durations for an indication of a remaining time period of the validity duration—a report of the validity duration includes the indication of the remaining time period of the validity duration indicative of the configured validity index

804

Calculate the validity duration for GNSS tracking information

806

Configure the report of the validity duration based on the calculated validity duration and at least one RRC entity

808

Encrypt the report of the validity duration including the indication of the remaining time period of the validity duration via an AS message or a NAS message—the report of the validity duration is encrypted prior to being transmitted to the network entity

810

Transmit, to a network entity, a report of a validity duration for GNSS tracking information—the GNSS tracking information is associated with an NTN including the UE and the network entity— the report includes an indication of a remaining time period of the validity duration based on a threshold

812

Receive, from the network entity or a core network based on the report of the validity duration, an authorization to switch to an RRC idle mode—the UE switches to the RRC idle mode based on the authorization to switch to the RRC idle mode

814

Delay the switch to the RRC idle mode after the expiration of the remaining time period of the validity duration based on at least one of an inactivity timer or a fixed time duration

816

Switch to an RRC idle mode based on the report of the validity duration—the RRC idle mode is switched to after an expiration of the remaining time period of the validity duration or based on a release message received from the network entity

FIG. 8

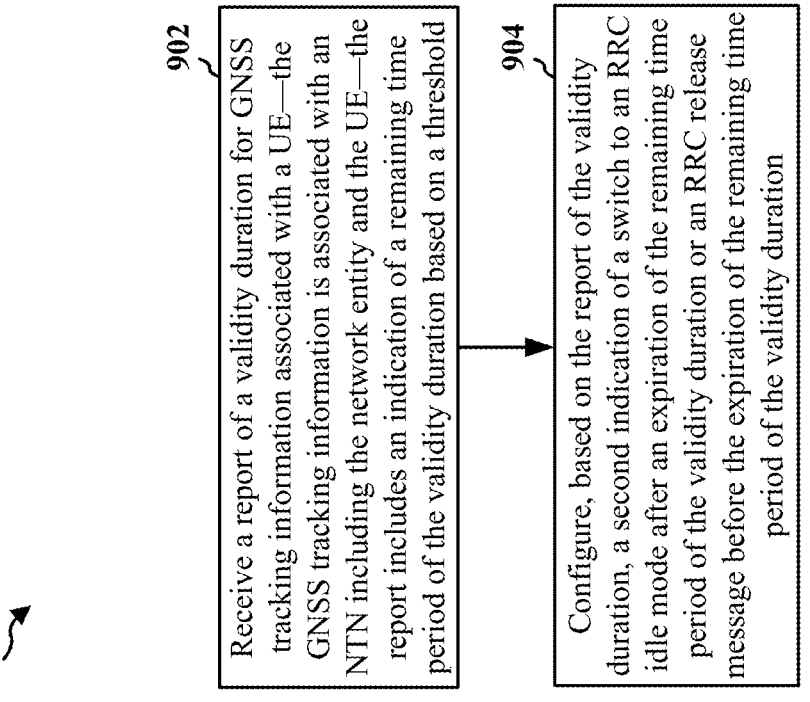

900

902

Receive a report of a validity duration for GNSS tracking information associated with a UE—the GNSS tracking information is associated with an NTN including the network entity and the UE—the report includes an indication of a remaining time period of the validity duration based on a threshold

904

Configure, based on the report of the validity duration, a second indication of a switch to an RRC idle mode after an expiration of the remaining time period of the validity duration or an RRC release message before the expiration of the remaining time period of the validity duration

FIG. 9

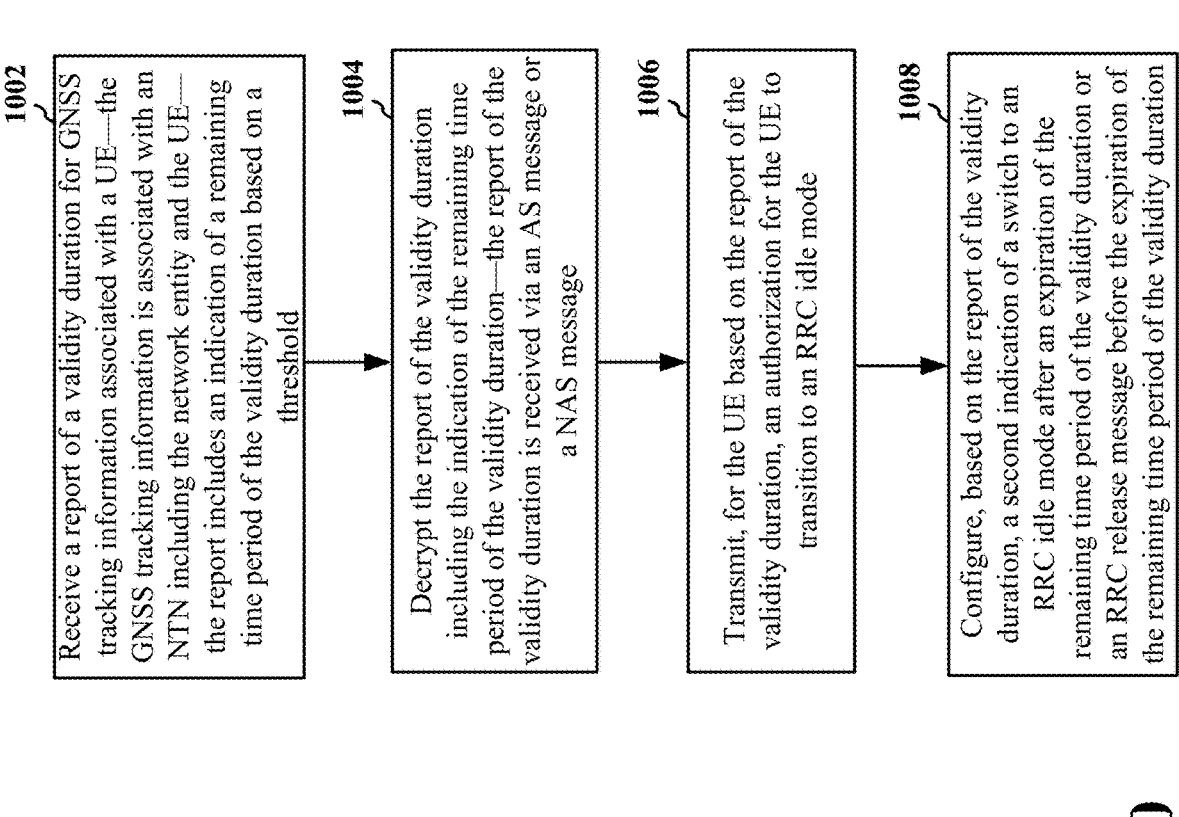

1000

1002

Receive a report of a validity duration for GNSS tracking information associated with a UE—the GNSS tracking information is associated with an NTN including the network entity and the UE—the report includes an indication of a remaining time period of the validity duration based on a threshold

1004

Decrypt the report of the validity duration including the indication of the remaining time period of the validity duration—the report of the validity duration is received via an AS message or a NAS message

1006

Transmit, for the UE based on the report of the validity duration, an authorization for the UE to transition to an RRC idle mode

1008

Configure, based on the report of the validity duration, a second indication of a switch to an RRC idle mode after an expiration of the remaining time period of the validity duration or an RRC release message before the expiration of the remaining time period of the validity duration

FIG. 10

GNSS VALIDITY REPORT IN IoT NTN

CROSS REFERENCE TO RELATED APPLICATION(S)

This application claims the benefit of and priority to U.S. Provisional Application Ser. No. 63/266,454, entitled "GNSS VALIDITY REPORT IN IOT NTN" and filed on Jan. 5, 2022, which is expressly incorporated by reference herein in its entirety.

TECHNICAL FIELD

The present disclosure relates generally to communication systems, and more particularly, to global navigation satellite system (GNSS) validity reporting in non-terrestrial networks (NTNs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may transmit, to a network entity, a report of a validity duration for global navigation satellite system (GNSS) tracking information, the GNSS tracking information being associated with a non-terrestrial network (NTN) including the user equipment (UE) and the network entity, the report including an indication of a remaining time period of the validity duration based on a threshold; and switch to a radio resource control (RRC) idle mode based on the report of the validity duration, the RRC idle mode being switched to after an expiration of the remaining time period of the validity duration or based on an RRC release message received from the network entity.

In another aspect of the disclosure, a method, a computer-readable medium, and an apparatus are provided. The apparatus may receive, from a user equipment (UE), a report of a validity duration for GNSS tracking information, the GNSS tracking information being associated with an NTN including the network entity and the UE, the report including an indication of a remaining time period of the validity duration based on a threshold; and configure, based on the report of the validity duration, a second indication of a switch to an RRC idle mode after an expiration of the remaining time period of the validity duration or an RRC release message before the expiration of the remaining time period of the validity duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 illustrates radio cells produced by a non-terrestrial network (NTN) device.

FIG. 7 is a flowchart of a method of wireless communication at a UE.

FIG. 8 is a flowchart of a method of wireless communication at a UE.

FIG. 9 is a flowchart of a method of wireless communication at a network entity.

FIG. 10 is a flowchart of a method of wireless communication at a network entity.

DETAILED DESCRIPTION

Figure 1:
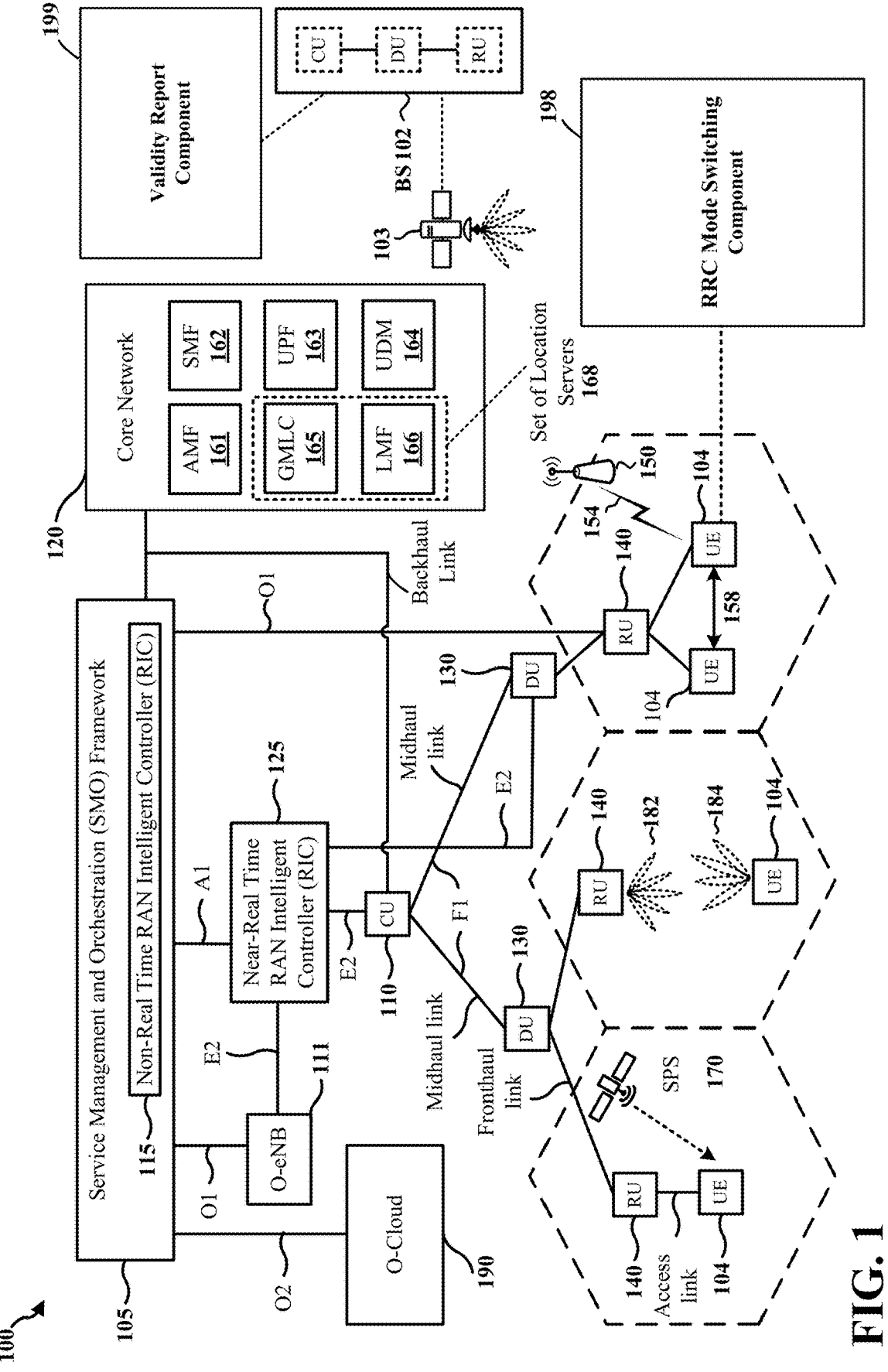
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same. In examples, the base station 102 may correspond to a non-terrestrial network (NTN) 103.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a radio RRC mode switching component 198 configured to transmit, to a network entity, a report of a validity duration for global navigation satellite system (GNSS) tracking information, the GNSS tracking information being associated with an NTN including the UE and the network entity, the report including an indication of a remaining time period of the validity duration based on a threshold; and switch to an RRC idle mode based on the report of the validity duration, the RRC idle mode being switched to after an expiration of the remaining time period of the validity duration or based on an RRC release message received from the network entity. In some aspects, the base station 102 may include a validity report component 199 configured to receive a report of a validity duration for GNSS tracking information associated with a UE, the GNSS tracking information being associated with an NTN including the network entity and the UE, the report including an indication of a remaining time period of the validity duration based on a threshold; and configure, based on the report of the validity duration, a second indication of a switch to an RRC idle mode after an expiration of the remaining time period of the validity duration or an RRC release message before the expiration of the remaining time period of the validity duration.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figures 2A, 2B, 2C, 2D:
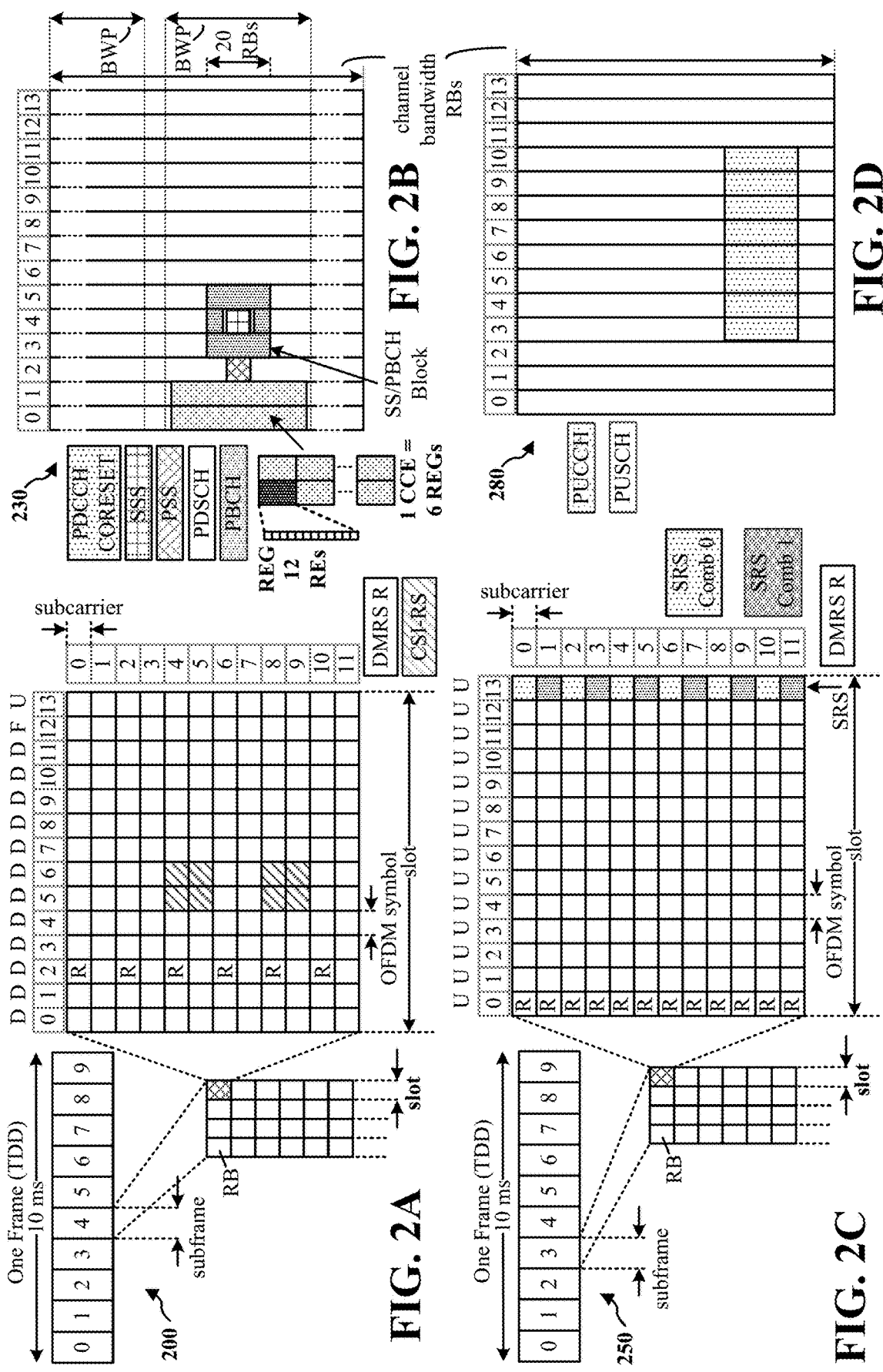
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| $\mu$ | SCS<br>$\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
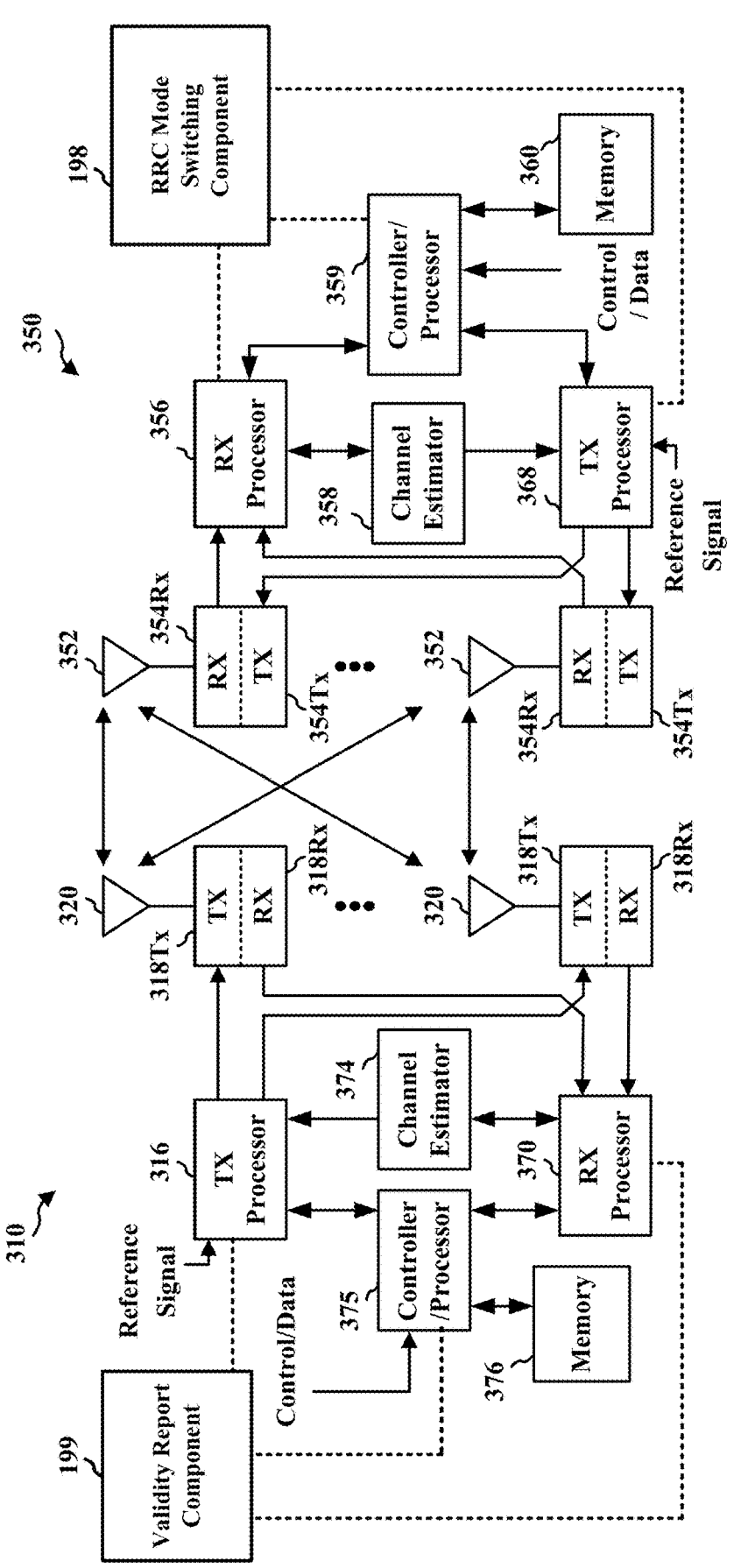
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points trans-mitted by the base station 310. These soft decisions may be based on channel estimates computed by the channel esti-mator 358. The soft decisions are then decoded and deinter-leaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The con-troller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer func-tionality associated with header compression/decompres-sion, and security (ciphering, deciphering, integrity protec-tion, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical chan-nels and transport channels, multiplexing of MAC SDUs onto TBs, demultiplexing of MAC SDUs from TBs, sched-uling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmit-ter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, con-trol signal processing to recover IP packets. The controller/ processor 375 is also responsible for error detection using an ACK and/or NACK protocol to support HARQ operations.

At least one of the TX processor 368, the RX processor 356, and the controller/processor 359 may be configured to perform aspects in connection with RRC mode switching component 199 of FIG. 1.

At least one of the TX processor 316, the RX processor 370, and the controller/processor 375 may be configured to perform aspects in connection with validity report compo-nent 199 of FIG. 1.

Wireless communication systems may be configured to share available system resources and provide various tele-communication services (e.g., telephony, video, data, mes-saging, broadcasts, etc.) based on multiple-access technolo-gies such as CDMA systems, TDMA systems, FDMA systems, OFDMA systems, SC-FDMA systems, TD-SCDMA systems, etc. that support communication with multiple users. In many cases, common protocols that facili-tate communications with wireless devices are adopted in various telecommunication standards. For example, com-munication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

FIG. 4 illustrates radio cells produced by a non-terrestrial network (NTN) device 410 over an area 400 that includes a number of Earth-fixed cells 402, as presented herein. A radio cell may include a single beam or multiple beams, e.g., all beams in a radio cell may use the same frequency or a radio cell may include one beam for each frequency in a set of different frequencies. For example, beams B1, B2, and B3 may support three separate radio cells (one beam per radio cell) or may collectively support a single radio cell (e.g., a radio cell 404 shown with dotted lines). A radio cell may or may not cover a single contiguous area.

Radio beams and radio cells produced by the NTN device 410 may not align with cells used by terrestrial wireless networks, e.g., NR terrestrial cells or LTE terrestrial cells. For example, in an urban area, a radio beam or radio cell produced by the NTN device 410 may overlap with many terrestrial cells. When supporting NTN access to a wireless network, radio beams and radio cells produced by the NTN device 410 may be hidden from the core network.

In the example of FIG. 4, cell B1 may be moving based on movements of the NTN device 410 and corresponding movements associated with the beam projected by the NTN device 410. The NTN device 410 may be transparent or may be a relay for base stations on the ground (e.g., as described in connection with the example of FIG. 5A). In examples, the NTN device 410 may be a base station, as described in connection with the examples of FIGS. 5B-5C.

In the example of FIG. 4, because the cell B1 is being projected by the NTN device 410, the coverage area of the cell B1 may change over time. That is, at time T1, the cell B1 may be served by the NTN device 410. At a later time (e.g., at time T2), the cell B1 may be turned off and a new cell may be activated. The new cell may be located in the same region as the first cell (e.g., the cell B1). The new cell may be projected by the NTN device 410 or may be projected by a second NTN device (e.g., second satellite).

The NTN device 410 may correspond to a high altitude platform system (HAPS) that serves one or more UEs on the ground. The NTN device 410 may project beams toward receivers on the ground to provide a serving area within the area 400 for a cell of the NTN device 410. The NTN device 410 may use directional beams for communication with one or more ground-based devices. Due to the aerial distance of the NTN device 410, a coverage area of a beam may have a larger size, e.g., a larger footprint than a beam of a terrestrial network device. For example, the NTN device 410 may project a single beam per cell or multiple beams per cell to provide the serving area. Each beam projected by the NTN device 410 may have a corresponding beam footprint on the ground. Thus, the cell of the NTN device 410 may have an area associated with one or more beam footprints. In an example, the NTN device 410 may project beams B1, B2, and B3, which may each have corresponding beam footprints that include the radio cell 404 of the NTN device 410, where the radio cell 404 may correspond to the serving area. The footprints of beams B1, B2, and B3 may be overlapping footprints, partially overlapping footprints, or non-overlapping footprints in various configurations.

In order to receive, from the NTN device 410, a PDSCH scheduled by a DCI, the UE may perform rate-matching around REs that are determined to be unavailable for a PDSCH reception. "Rate-matching" refers to a technique where a communication device determines and/or utilizes resources for a second procedure that do not overlap with resources for a first procedure. For example, if the UE 802 rate-matches around PDCCH resources for receiving a PDSCH, the UE 802 may determine the resources used for the PDCCH and exclude such resources for the PDSCH reception. The excluded resources may correspond to unavailable REs that are reserved for other purposes (e.g., associated with the PDCCH). Hence, available REs (e.g., not used for the PDCCH) may be used for receiving the PDSCH scheduled by the DCI.

DCI received by the UE may point to particular PDSCH resources, such as resources of one or more RBs. The one or more RBs may include a first subset of REs that are reserved for the other purposes (e.g., associated with the PDCCH) and a second subset of REs that may be used for receiving the PDSCH. Hence, the UE may determine that the first subset of REs is not available for the PDSCH reception, so that when the UE receives a TB associated with the PDSCH scheduled by the DCI, the UE may rate-match around the unavailable REs for receiving the PDSCH. That is, the UE may skip the REs that are not available for receiving the PDSCH, such that the UE may receive/decode information via the REs that are available for receiving the PDSCH.

The first subset of REs corresponding to the unavailable REs may be reserved or used for a potential PDCCH to schedule a SIB. For example, the PDCCH may correspond to at least part of the first subset of REs for scheduling a SIB1. Thus, in order to receive, from the NTN device 410, the PDSCH scheduled by the DCI, the UE may perform rate-matching around the resources used for the PDCCH to schedule the SIB. A time-and-frequency domain location of the PDCCH resources for scheduling the SIB may be indicated based on a ControlResourceSet parameter and/or a searchSpace parameter. For example, a time-and-frequency domain location of the PDCCH resources for scheduling the SIB1 may be indicated based on a ControlResourceSetZero parameter and/or a searchSpaceZero parameter.

The UE may be configured with higher layer parameters for indicating REs that are not available for PDSCH reception. For instance, within a BWP, a frequency domain resource of a CORESET may be configured, e.g., based on a ControlResourceSet with a controlResourceSetId or a ControlResourceSetZero. A time domain resource may also be determined, e.g., based on the higher layer parameters, such as monitoringSlotPeriodicityAndOffset, duration, and monitoringSymbolsWithinSlot of search-space-sets configured by a SearchSpace and a time domain resource of search-space-set zero configured by searchSpaceZero associated with the CORESET as well as a CORESET duration configured by the ControlResourceSet with the controlResourceSetId or the ControlResourceSetZero. The resources that are not available for the PDSCH reception may be included in one or two groups of resource sets (e.g., associated with the higher layer parameters rateMatchPatternGroup1 and rateMatchPatternGroup2).

Figures 5A, 5B, 5C:
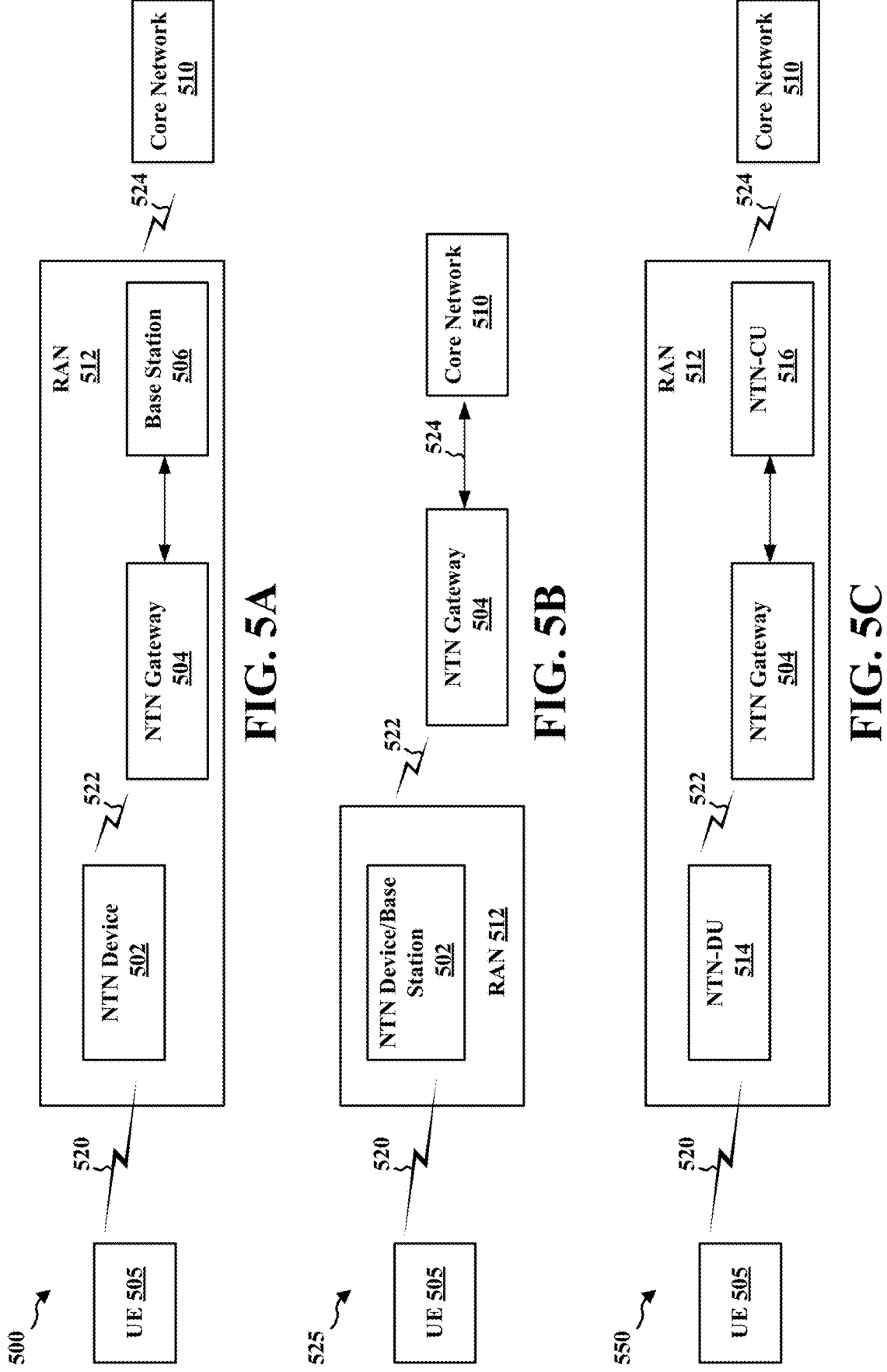
FIG. 5A illustrates a network architecture with transparent payloads.
FIG. 5B illustrates a network architecture capable of supporting NTN access.
FIG. 5C illustrates a network architecture capable of supporting NTN access.

FIG. 5A illustrates an example network architecture 500 capable of supporting NTN access, e.g., using 5G NR, as presented herein. Although the aspects are described using the example of 5G NR, the concepts presented herein may also be applied for other types of core networks. FIG. 5A illustrates a network architecture with transparent payloads. While aspects of FIG. 5A illustrate a 5G-based network, similar network implementations and configurations may be used for other communication technologies, such as 3G, 4G LTE, etc.

The network architecture 500 of FIG. 5A includes a UE 505, an NTN device 502, an NTN gateway 504 (sometimes referred to as "gateways," "earth stations," or "ground stations"), and a base station 506 having the capability to communicate with the UE 505 via the NTN device 502. The NTN device 502, the NTN gateway 504, and the base station 506 may be part of a RAN 512 (e.g., an NG RAN).

The base station 506 may be a network node that corresponds to the base station 310 of FIG. 3. The network architecture 500 is illustrated as further including a core network 510. In some aspects, the core network 510 may include a number of Fifth Generation (5G) networks including 5G Core Networks (5GCNs) and may correspond to the core network 190 described in connection with FIG. 1. The core network 510 may be public land mobile networks (PLMN) that may be located in the same country or in different countries. In some aspects, the core network may be 5GCNs.

Permitted connections in the network architecture 500 with transparent payloads illustrated in FIG. 5A, allow the base station 506 to access the NTN gateway 504 and the core network 510. In some examples, the base station 506 may be shared by multiple PLMNs. Similarly, the NTN gateway 504 may be shared by more than one base station.

FIG. 5A provides a generalized illustration of various components, any or all of which may be utilized as appropriate, and each of which may be duplicated or omitted, as necessary. Specifically, although the example of FIG. 5A includes one UE 505, it should be understood that many UEs (e.g., hundreds, thousands, millions, etc.) may utilize the network architecture 500. Similarly, the network architecture 500 may include a larger (or smaller) number of NTN devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 505 is configured to communicate with the core network 510 via the NTN device 502, the NTN gateway 504, and the base station 506. As illustrated by the RAN 512, one or more RANs associated with the core network 510 may include one or more base stations. Access to the network may be provided to the UE 505 via wireless communication between the UE 505 and the base station 506 (e.g., a serving base station), via the NTN device 502 and the NTN gateway 504. The base station 506 may provide wireless communications access to the core network 510 on behalf of the UE 505, e.g., using 5G NR.

The base station 506 may be referred to by other names such as a gNB, a "satellite node," a satellite NodeB (sNB), "satellite access node," etc. The base station 506 may not be the same as terrestrial network gNB s, but may be based on a terrestrial network gNB with additional capability. For example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-geostationary-Earth-orbit (GEO) devices) and associated mobility of the UE 505. The base station 506 may assist in the handover (or transfer) of the NTN device 502 between different NTN gateways, different base stations, and between different countries. In some examples, the base station 506 may be separate from the NTN gateway 504, e.g., as illustrated in the example of FIG. 5A. In other examples, the base station 506 may include or may be combined with one or more NTN gateways, e.g., using a split architecture. For example, with a split architecture, the base station 506 may include a Central Unit (CU), such as the example CU 110 of FIG. 1, and the NTN gateway 504 may include or act as Distributed Unit (DU), such as the example DU 130 of FIG. 1. The base station 506 may be fixed on the ground with transparent payload operation. In one implementation, the base station 506 may be physically combined with, or physically connected to, the NTN gateway 504 to reduce complexity and cost.

The NTN gateway 504 may be shared by more than one base station and may communicate with the UE 505 via the NTN device 502. The NTN gateway 504 may be dedicated to one associated constellation of NTN devices. The NTN gateway 504 may be included within the base station 506, e.g., as a base station-DU within the base station 506. The NTN gateway 504 may communicate with the NTN device 502 using control and user plane protocols. The control and user plane protocols between the NTN gateway 504 and the NTN device 502 may: (i) establish and release the NTN gateway 504 to the NTN device 502 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 502 or radio cell to another NTN gateway.

Support of transparent payloads with the network architecture 500 shown in FIG. 5A may impact the communication system as follows. The core network 510 may treat a satellite RAT as a new type of RAT with longer delay, reduced bandwidth and/or higher error rate. Consequently, there may be some impact to PDU session establishment and mobility management (MM) and connection management (CM) procedures. The NTN device 502 may be shared with other services (e.g., satellite television, fixed Internet access) with 5G NR mobile access for UEs added in a transparent manner. This may enable legacy NTN devices to be used and may avoid the need to deploy a new type of NTN device. Further, the base station 506 may be fixed and may be configured to support one country or multiple countries and one or more PLMNs in that one country or in those multiple countries. The base station 506 may assist assignment and transfer of the NTN device 502 and radio cells between the base station 506 and the NTN gateway 504 and support handover of the UE 505 between radio cells, NTN devices, and other base stations. Thus, the base station 506 may differ from a terrestrial network gNB. Additionally, a coverage area of the base station 506 may be much larger than the coverage area of a terrestrial network base station.

In some implementations, the radio beam coverage of the NTN device 502 may be large, e.g., up to or greater than 4000 km across, and may provide access to more than one country. The base station 506 may be shared by multiple base stations, and the base station 506 may be shared by multiple core networks in separate PLMNs located in the same country or in different countries.

In the illustrated example of FIG. 5A, a service link 520 may facilitate communication between the UE 505 and the NTN device 502, a feeder link 522 may facilitate communication between the NTN device 502 and the NTN gateway 504, and an interface 524 may facilitate communication between the base station 506 and the core network 510. The service link 520 and the feeder link 522 may be implemented by a same radio interface (e.g., the NR-Uu interface). The interface 524 may be implemented by the NG interface.

FIG. 5B shows a diagram of a network architecture 525 capable of supporting NTN access, e.g., using 5G NR, as presented herein. The network architecture 525 shown in FIG. 5B is similar to that shown in FIG. 5A, like designated elements being similar or the same. FIG. 5B, however, illustrates a network architecture with regenerative payloads, as opposed to transparent payloads shown in FIG. 5A. A regenerative payload, unlike a transparent payload, includes an on-board base station (e.g., includes the functional capability of a base station), and is referred to herein as an NTN device 502/base station. The on-board base station may be a network node that corresponds to the base station 310 in FIG. 3. The RAN 512 is illustrated as including the NTN device 502/base station. Reference to the NTN device 502/base station may refer to functions related to communication with the UE 505 and the core network 510 and/or to functions related to communication with the NTN gateway 504 and with the UE 505 at a physical radio frequency level.

An on-board base station may perform many of the same functions as the base station 506 as described previously. For example, the NTN device 502/base station may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device 502/base station may also support signaling connections and voice and data bearers to the UE 505 and may support handover of the UE 505 between different radio cells for the NTN device 502/base station and between different NTN device/base stations. The NTN device 502/base station may assist in the handover (or transfer) of the UE 505 between different NTN gateways, different control networks, and between different countries. The NTN device 502/base station may hide or obscure specific aspects of the NTN device 502/base station from the core network 510, e.g., by interfacing to the core network 510 in the same way or in a similar way to a terrestrial network base station. The NTN device 502/base station may further assist in sharing of the NTN device 502/base station over multiple countries. The NTN device 502/base station may communicate with one or more NTN gateways and with one or more core networks via the NTN gateway 504. In some aspects, the NTN device 502/base station may communicate directly with other NTN device/base stations using Inter-Satellite Links (ISLs), which may support an Xn interface between any pair of NTN device/base stations.

With low-Earth-orbit (LEO) devices, the NTN device 502/base station may manage moving radio cells with coverage in different countries at different times. The NTN gateway 504 may be connected directly to the core network 510, as illustrated. The NTN gateway 504 may be shared by multiple core networks, for example, if NTN gateways are limited. In some examples the core network 510 may need to be aware of coverage area(s) of the NTN device 502/base station in order to page the UE 505 and to manage handover. Thus, as can be seen, the network architecture 525 with regenerative payloads may have more impact and complexity with respect to both the NTN device 502/base station and the core network 510 than the network architecture 500 including transparent payloads, as shown in FIG. 5A.

Support of regenerative payloads with the network architecture 525 shown in FIG. 5B may impact the network architecture 525 as follows. The core network 510 may be impacted if fixed tracking areas and fixed cells are not supported, because core components of mobility management and regulatory services, which are based on fixed cells and fixed tracking areas for terrestrial PLMNs, may be replaced by a new system (e.g., based on a location of the UE 505). If fixed tracking areas and fixed cells are supported, the core network 510 may map any fixed tracking area to one or more NTN device/base stations with current radio coverage of the fixed tracking area when performing paging of the UE 505 that is located in this fixed tracking area. This could include configuration in the core network 510 of long term orbital data for the NTN device 502/base station (e.g., obtained from an operator of the NTN device 502/base station) and could add significant new impact to core network 510.

The NTN device 502/base station may support regulatory and other specifications for multiple countries. A GEO device coverage area may include several or many countries, whereas a LEO device or a medium-Earth-orbit (MEO) device may orbit over many countries. Support of fixed tracking areas and fixed cells may then include the NTN device 502/base station configured with fixed tracking areas and fixed cells for an entire worldwide coverage area. Alternatively, the core network 510 may support fixed tracking areas and fixed cells for the associated PLMN to reduce complexity of the NTN device 502/base station and at the expense of more complexity at the core network 510. Additionally, ISLs between NTN device/base stations may change dynamically as relative NTN device 502/base station positions change.

In the illustrated example of FIG. 5B, a service link 520 may facilitate communication between the UE 505 and the NTN device 502/base station, a feeder link 522 may facilitate communication between the NTN device 502/base station and the NTN gateway 504, and an interface 524 may facilitate communication between the NTN gateway 504 and the core network 510. The service link 520 may be implemented by the NR-Uu interface. The feeder link 522 may be implemented by the NG interface over SRI. The interface 524 may be implemented by the NG interface.

FIG. 5C shows a diagram of a network architecture 550 capable of supporting NTN access, e.g., using 5G NR, as presented herein. The network architecture shown in FIG. 5C is similar to that shown in FIGS. 5A and 5B, like designated elements being similar or the same. FIG. 5C, however, illustrates a network architecture with regenerative payloads, as opposed to transparent payloads, as shown in FIG. 5A, and with a split architecture for the base station. For example, the base station may be split between a Central Unit (CU), such as the CU 110 of FIG. 1, and a Distributed Unit (DU), such as the DU 130 of FIG. 1. In the illustrated example of FIG. 5C, the network architecture 550 includes an NTN-CU 516, which may be a ground-based base station or a terrestrial base station. The regenerative payloads include an on-board base station DU, and is referred to herein as an NTN-DU 514. The NTN-CU 516 and the NTN-DU 514, collectively or individually, may correspond to the network node associated with the base station 310 in FIG. 3.

The NTN-DU 514 communicates with the NTN-CU 516 via the NTN gateway 504. The NTN-CU 516 together with the NTN-DU 514 perform functions, and may use internal communication protocols, which are similar to or the same as a gNB with a split architecture. In the example, the NTN-DU 514 may correspond to and perform functions similar to or the same as a gNB Distributed Unit (gNB-DU), while the NTN-CU 516 may correspond to and perform functions similar to or the same as a gNB Central Unit (gNB-CU). However, the NTN-CU 516 and the NTN-DU 514 may each include additional capability to support UE 505 access using NTN devices.

The NTN-DU 514 and the NTN-CU 516 may communicate with one another using an F1 Application Protocol (F1AP), and together may perform some or all of the same functions as the base station 506 or the NTN device 502/base station as described in connection with FIGS. 5B and 5C, respectively.

The NTN-DU 514 may terminate the radio interface and associated lower level radio interface protocols to the UE 505 and may transmit DL signals to the UE 505 and receive UL signals from the UE 505, which may include encoding and modulation of transmitted signals and demodulation and decoding of received signals. The operation of the NTN-DU 514 may be partly controlled by the NTN-CU 516. The NTN-DU 514 may support one or more NR radio cells for the UE 505. The NTN-CU 516 may also be split into separate control plane (CP) (NTN-CU-CP) and user plane (UP) (NTN-CU-UP) portions. The NTN-DU 514 and the NTN-CU 516 may communicate over an F1 interface to (a) support control plane signaling for the UE 505 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

The NTN-CU 516 may communicate with one or more other NTN-CUs and/or with one more other terrestrial base stations using terrestrial links to support an Xn interface between any pair of NTN-CUs and/or between the NTN-CU 516 and any terrestrial base station.

The NTN-DU 514 together with the NTN-CU 516 may: (i) support signaling connections and voice and data bearers to the UE 505; (ii) support handover of the UE 505 between different radio cells for the NTN-DU 514 and between different NTN-DUs; and (iii) assist in the handover (or transfer) of NTN devices between different NTN gateways, different core networks, and between different countries. The NTN-CU 516 may hide or obscure specific aspects of the NTN devices from the core network 510, e.g., by interfacing to the core network 510 in the same way or in a similar way to a terrestrial network base station. The NTN-CU 516 may further assist in sharing of NTN devices over multiple countries.

In the network architecture 550 of FIG. 5C, the NTN-DU 514 that communicates with and is accessible from an NTN-CU may change over time with LEO devices. With the split base station architecture, the core network 510 may connect to NTN-CUs that are fixed and that do not change over time, which may reduce difficulty with paging of the UE 505. For example, the core network 510 may not need to know which NTN-DU is needed for paging the UE 505. The network architecture with regenerative payloads with a split base station architecture may thereby reduce the core network 510 impact at the expense of additional impact to the NTN-CU 516.

Support of regenerative payloads with a split base station architecture, as shown in FIG. 5C, may impact the network architecture 550 as follows. The impact to the core network 510 may be limited as for the transparent payloads (e.g., the NTN device 502) discussed above. For example, the core network 510 may treat a satellite RAT in the network architecture 550 as a new type of RAT with longer delay, reduced bandwidth and/or higher error rate. The impact on the NTN-DU 514 may be less than the impact on NTN device/base stations (e.g., the NTN device 502/base station with a non-split architecture), as discussed above in reference to FIG. 5B. The NTN-DU 514 may manage changing association with different (fixed) NTN-CUs. Further, the NTN-DU 514 may manage radio beams and radio cells. The NTN-CU 516 impacts may be similar to the impact of the base station 506 for a network architecture with transparent payloads, as discussed above, except for extra impacts to manage changing associations with different NTN-DUs and reduced impacts to support radio cells and radio beams, which may be transferred to the NTN-DU 514.

Figure 6:
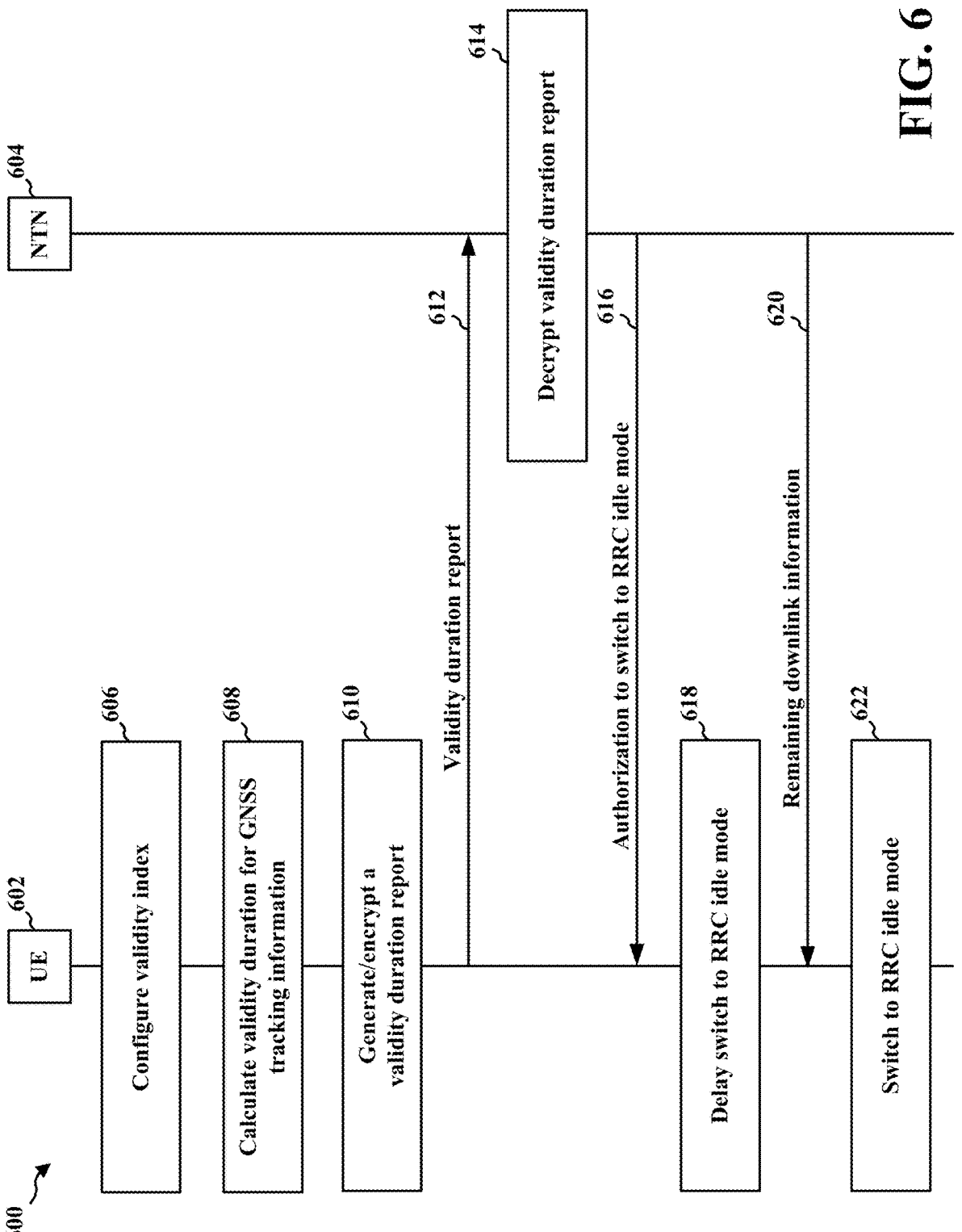
FIG. 6 is a call flow diagram illustrating communication between a UE and a network device.

FIG. 6 is a call flow diagram 600 illustrating communications between a UE 602 and a network device, such as a network device of the NTN 604. While the network device in the diagram 600 is associated with the NTN 604 for exemplary purposes, aspects of the call flow diagram 600 may also be performed in association with terrestrial networks and/or terrestrial network devices. At 606, the UE 602 may configure a validity index, which may be used for reporting GNSS tracking information. The validity index may be configured, at 606, based on a predefined set of validity durations or a generated set of validity durations. At 608, the UE 602 may calculate the validity duration for the GNSS tracking information, which may be reported to the NTN 604. In some aspects, the NTN 604 may be a network node. In some aspects, the network node may be implemented as or include an aggregated base station, a disaggregated base station, an integrated access and backhaul (IAB) node, a relay node, a sidelink node, or the like. In some aspects, the NTN 604 may be implemented in an aggregated or monolithic base station architecture, or alternatively, in a disaggregated base station architecture, and may include one or more of a CU, a DU, an RU, a Near-Real Time (Near-RT) RAN Intelligent Controller (RIC), or a Non-Real Time (Non-RT) RIC.

As used herein, the term "validity duration" may refer to a time duration in which GNSS tracking information may be assumed (e.g., by a network) to be valid for a UE. At 610, the UE 602 may generate a validity duration report based on the validity duration calculated, at 608, for the GNSS tracking information. The validity duration report may include a validity duration from the configured validity index, which may be indicative of an expiration time of the validity duration for the GNSS tracking information. In examples, the validity duration report may also be encrypted, at 610, to provide a level of security to the validity duration report. At 612, the UE 602 may transmit the (e.g., encrypted) validity duration report to the NTN 604, which may include an indication (e.g., a validity duration from the configured validity index) associated with a remaining time period of the validity duration for the GNSS tracking information.

If the validity duration report received, at 612, by the NTN 604 is encrypted, the NTN 604 may decrypt, at 614, the validity duration report. At 616, the NTN 604 may transmit an authorization to the UE 602 to switch to an RRC idle mode based on the validity duration report received, at 612, from the UE 602 and based on an expiration time of the validity duration for the GNSS tracking information. In some examples, the UE 602 may be configured to autonomously switch to the RRC idle mode after the validity duration for the GNSS tracking information expires, e.g., without receiving, at 616, the authorization from the NTN 604.

At 618, the UE 602 may delay the switch to the RRC idle mode based on an inactivity timer or a fixed time (e.g., 1.25 sec.). The delay may provide the UE 602 additional time to receive a downlink message, such as pending downlink data, an RRC release message, etc., before the UE 602 switches to the RRC idle mode. For example, the UE 602 may receive, at 620, remaining down information from the NTN 604, but may not transmit further uplink transmissions to the NTN 604 during the delay period. At 622, after the UE 602 delays, at 618, the switch to the RRC idle mode and/or receives, at 620, the remaining downlink information from the NTN 604, the UE 602 may switch, at 622, to the RRC idle mode.

The NTN 604 may be associated with enhanced machine type communication (eMTC) devices and/or narrowband-IoT (NB-IoT) devices. In examples, the devices may be half-duplex UEs that are not capable of simultaneously receiving GNSS data and transmitting unicast/broadcast data. The UE 602 may communicate with the NTN 604 based on a calibration of GNSS data, where the UE 602 may acquire the GNSS data to determine a location/position of the UE 602. eMTC and NB-IoT devices may be low complexity UEs (e.g., with a low processing power) that may not have a capability to process the unicast/broadcast data together with the GNSS data.

Since the UE 602 may be unable to transmit and receive data simultaneously, a unicast/broadcast transmission of the UE 602 may interfere with a reception of GNSS data by the UE 602. Similarly, a GNSS data reception may interfere with a simultaneous unicast/broadcast transmission. Thus, if a first communication mechanism associated with a first type of data is active, interference may be received via activation of a second communication mechanism associated with a second type of data, as half-duplex UEs may either transmit or receive at one time on one channel.

The UE 602 may attempt to "fix" the GNSS, which may refer to decoding the GNSS data to determine a location of the UE 602. In some cases, the GNSS fixing procedure may be performed over an increased amount of time (e.g., 10 sec., 50 sec., 100 sec., etc.). The amount of time for fixing the GNSS may be based on a type of data or an amount of data received by the UE 602. If the UE 602 is decoding the GNSS data, the decoding procedure may not allow uplink transmissions to be performed in association with half-duplex configurations. Therefore, fixing the GNSS may disrupt an RRC connection. After short/sporadic transmissions of a UE that is in an RRC connected state, the UE may transition (e.g., switch) to an RRC idle mode and subsequently reacquire the GNSS data, if the GNSS data becomes invalid/expires.

In some aspects, the UE 602 may autonomously determine a GNSS validity duration X and report, at 612, to the NTN 604, information associated with the validity duration via RRC signaling. After the UE 602 acquires the GNSS data, the UE 602 may initiate a validity timer. In examples, the validity duration may correspond to X={10 sec., 20 sec., 30 sec., 40 sec., 50 sec., 60 sec., 5 min., 10 min., 15 min., 20 min., 25 min., 30 min., 60 min., 90 min., 120 min., or infinity}. The duration of a short transmission may not be longer than the validity timer used for uplink synchronization. When the validity timer expires, the UE 602 may not perform an uplink/downlink communication without reacquiring the GNSS data. If the UE 602 has further uplink data to transmit to a base station of the NTN 604, the UE 602 may restart a connection procedure with the base station of the NTN 604.

After the UE 602 determines a location of the UE 602 based on the GNSS data, the UE 602 may perform a timing compensation procedure and/or a frequency compensation procedure. If the UE 602 initiates a connection with the NTN 604 before transmitting an uplink communication, the UE 602 may have to adjust the timing compensation and/or the frequency compensation. If the UE 602 transitions (e.g., switches) to the connected mode, but the validity timer expires, the UE 602 may also have to adjust the timing compensation and/or the frequency compensation. In such cases, the UE 602 may switch, at 622, to the RRC idle mode.

The UE 602 may also assist the NTN 604 by providing an advance indication (e.g., validity duration report, at 612) of a time at which the UE 602 may release from the RRC connected mode and transitioned/switch, at 622, to the RRC idle mode. The UE 602 may report, at 612, information associated with the validity duration to the NTN 604 via RRC signaling. However, a synchronization procedure may have to be performed between the UE 602 and the NTN 604 in association with the report, at 612, and the RRC release procedure (e.g., the switch, at 622). For example, the NTN 604 may initiate an RRC release procedure or the UE 602 may be configured to switch, at 622, to the RRC idle mode autonomously. Further, GNSS validity duration reporting, at 612, may be performed with reduced signaling overhead for transitioning the UE 620 to the RRC idle mode.

If the UE 602 does not report, at 612, the validity duration, the NTN 604 may not determine when the UE 602 will switch, at 622, to the RRC idle mode. Thus, the UE 602 may be release from the RRC connected mode without an indication to the NTN 604. The GNSS validity duration report may be indicative of the validity duration X (e.g., calculated, at 608). In an example, the UE 602 may acquire the GNSS data, set the validity timer to 5 min., and report, at 612, the validity duration to the NTN 604. However, if a number of bits is configured, e.g., based on a 5 min. validity duration, signaling overhead may be large. Thus, the defined durations may correspond to an index value (e.g., index value 0=10 sec., index value 1=20 sec., etc.) and the index value may be reported, at 612, to the NTN 604. A value of infinity may not have to be reported, at 612, to the NTN 604. For example, the NTN 604 may assume that the GNSS validity duration is valid for infinity or for a duration of the RRC connection, if an index value is not otherwise received, at 612, by the NTN 604.

In a first aspect associated with GNSS validity reporting, the UE 602 may indicate a validity index X (e.g., based on 4 bits) and a system frame number (SFN) reference point (e.g., based on 10 bits). In addition to the validity index X, the UE 602 may report, at 612, the reference point for the validity duration, as the UE 602 may immediately start a validity timer upon acquiring the GNSS data. Thus, the NTN 604 may not otherwise be able to determine an exact time that the UE 602 started the validity timer as a result of fixing/acquiring the GNSS data. The reference point may be indicated based on the SFN or based on another type of indicator. Alternatively, rather than reporting the reference point, at 612, the reference point may be set to 0 and the UE 602 may report, at 612, a closest validity index to the reference point. For example, if SFN=0, the UE 602 may report, at 612, the closest validity index X with respect to the reference point. In an example where the UE 602 reports the GNSS validity duration as being 10 sec., the closest validity index for reporting the GNSS validity duration may be 20 sec., which the UE 602 may report, at 612, to the NTN 604. Hence, if an SFN is indicated, the UE 602 may report, at 612, based on a more precise value. Otherwise, the UE 602 may report, at 612, based on the validity index configured, at 606.

In a second aspect associated with GNSS validity reporting, the UE 602 may report, at 612, a remaining validity time (e.g., X). The remaining validity time may be reported, at 612, based on 4 bits. Thus, rather than reporting, at 612, the validity duration, the UE 602 may report a total duration minus a current time. The remaining validity time may be reported, at 612, in a format that corresponds to the validity index. For example, the remaining validity time may be one of the X values. In an example, if the remaining validity time is 20 sec., but by the time the UE 602 transmits the report, the remaining validity time is 10 sec., the UE 602 may report, at 612, an index value of 0, rather than an index value of 1. Based on X={10 sec., 20 sec., 30 sec., 40 sec., 50 sec., 60 sec., 5 min., 10 min., 15 min., 20 min., 25 min., 30 min., 60 min., 90 min., 120 min., or infinity}, the index value of 0 may correspond to 10 sec., the index value of 1 may correspond to 20 sec., etc.

In a third aspect associated with GNSS validity reporting, the UE 602 may report, at 612, the remaining validity time based on validity durations Y (e.g., associated with 5 or more bits) with more granularity than the validity durations X (e.g., associated with 4 bits). For example, Y={1 sec., 2 sec., 3 sec., 4 sec., 5 sec., 10 sec., 20 sec., 30 sec., 40 sec., 50 sec., 1 min., 2 min., 3 min., 4 min., 5 min., 10 min., 15 min., 20 min., 25 min., 30 min., 60 min., 90 min., 120 min., or infinity}. The set of validity durations Y may be hardcoded or configured at the UE 602, such that the UE 602 may report, at 612, an index for a value included in the set of validity durations Y. For example, the UE 602 may report, at 612, a remaining validity time based on the indexed value from the set of validity durations Y.

In a fourth aspect associated with GNSS validity reporting, the UE 602 may indicate, at 612, validity information to the NTN 604 with an increased level of accuracy (e.g., based on an increased number of bits). For example, the UE 602 may report, at 612, the validity information based on a timing function indicative of the remaining validity time for the GNSS data. An output of the timing function may provide validity duration values that fill in the gaps, e.g., between values included in the sets of validity durations X and Y, which may provide more accurate timing information/validity durations than the values included in the sets of validity durations X and Y.

Rather than the UE 602 reporting, at 612, the validity duration or a value of the remaining validity time, a threshold may be utilized for reporting, at 612, the remaining validity time for the GNSS data. The threshold may be a predefined threshold or a broadcast threshold based on signaling techniques. The threshold may be configured, e.g., at 5 sec., 10 sec., 20 sec., etc. The threshold may also be used to allow the NTN 604 to authorize, at 616, the release of the UE 602 to the RRC idle mode before the UE 602 reaches a state where the UE 602 is unable to perform a transmission until the UE 602 has reconfirmed/reacquired the GNSS data. In an example, if the UE 602 determines that 5 sec. is remaining before the validity timer expires, the UE 602 may report, at 612, the remaining validity time in advance of the timer expiring (e.g., based on the threshold).

If the remaining GNSS validity time becomes less than the threshold while the UE 602 is in the RRC connected mode, the UE 602 may report, at 612, the remaining validity time to the NTN 604. For example, if the threshold was set to 10 sec., then as soon as the remaining GNSS validity time becomes less than 10 sec., the UE 602 may report, at 612, an actual remaining validity time (e.g., with a granularity of 1 sec.) to the NTN 604. A 4-bit field may be used to signal values up to 16 seconds, e.g., where value 0 may correspond to 1 remaining second. The 4-bit field may be associated with 16 code points. In an example, 1-5 remaining seconds may correspond to 5 of the code points, and the remaining 11 code points may be on the order of milliseconds (e.g., 10 ms, 20 ms, etc.), which may provide further granularity for reporting the remaining validity time.

In some configurations, rather than reporting, at 612, a value of the remaining validity time, an access stratum (AS) MAC-control element (MAC-CE) may be utilized to indicate that the threshold is reached. For example, the UE 602 may trigger/transmit via the MAC-CE an indication to the NTN 604 that corresponds to the remaining validity time reaching the threshold. Based on the indication, the UE 602 may determine that the remaining validity time has reached the configured threshold, e.g., which may be 5 sec. The UE 602 may not report, at 612, exact remaining values, but an indication that the threshold is reached. A time reference may be associated with a subframe that corresponds to a last subframe of a PUSCH repetition plus a round trip time (RTT) or a half-RTT between the UE 602 and the NTN 604.

The GNSS validity report may be signaled, at 612, to the NTN 604 based on an RRC message. For example, the RRC message may correspond to a message (Msg) 5 (Msg5) or other message based on the UE 602 being in the RRC connected mode. For instance, the Msg5 may carry an RRC setup complete message. The validity duration may be reported, at 612, to the NTN 604 in association with a protocol indicative of a time at which the UE 602 may transition to the RRC idle mode. If the validity report is transmitted, at 612, without integrity protection (e.g., without encryption, at 610), validity information included in the validity report may be subject to manipulation by an attacker, such that the UE 602 may be released at a different time than indicated, at 612, by the validity duration report.

In a first example, the GNSS validity report may be transmitted, at 612, in the RRC message based on a Msg5 without the integrity protection (e.g., encryption, at 610). In a second example, a Msg3 may be utilized if the transmission, at 612, includes available space/resources for the Msg3, or in a Msg5 without integrity protection (e.g., encryption, at 610), if the transmission, at 612, does not include available space/resources for the Msg3. While the GNSS validity report may be indicated, at 612, in the RRC message in some cases, the GNSS validity report may be indicated, at 612, via the MAC-CE in other cases.

In further examples, if the UE 602 receives a malicious attack to the integrity of the GNSS validity report, the UE 602 may switch, at 622, to the RRC idle mode. However, the UE 602 may have to perform an RRC connection procedure to reacquire the GNSS data, which may increase power consumption costs. In an example, the UE 602 may indicate that the validity timer expires in 1 min., but due to an intervening attack the validity timer may be adjusted to 10 sec., and the UE 602 may release/switch, at 622, to the RRC idle mode before 1 min, such that the UE 602 may not be able to complete a communication with the NTN 604.

Accordingly, the GNSS validity report may be signaled, at 612, in RRC message over a dedicated control channel (DCCH) after AS security is activated. The UE 602 may report, at 612, over the DCCH in examples associated with eMTC devices. Alternatively, the UE 602 may transmit, at 612, a NAS message with encryption performed, at 610, to an upper layer. A base station of the NTN 604 may not be configured to decode the information in the NAS message, but a core network of the NTN 604 that that receives the NAS message may decode the information and control a release/switch, at 622, of the UE 602 to the RRC idle mode. For example, the UE release procedure may be initiated by the core network. The UE 602 may also report, at 612, GNSS validity information in an RRC message (e.g., Msg5) together with the NAS message to provide integrity protection parameters, such as count values. The signaled GNSS validity time may be associated with the integrity protection parameter.

If the validity timer expires, the UE 602 may transition/switch, at 622, to the RRC idle mode. However, the UE 602 may transmit an AS message or a NAS message to the NTN 604 before the GNSS validity duration ends. The UE 602 may autonomously execute an RRC release procedure without receiving (e.g., at 616) an RRC connection release message from the NTN 604. The message transmitted, at 612, to the NTN 604 prior to the end of the GNSS validity duration may indicate that the UE 602 intends to switch, at 622, to the RRC idle mode. In cases where the UE 602 is not authorized to switch, at 622, to the RRC idle mode autonomously, the NTN 604 may authorize, at 616, the release/switch, at 622, of the UE 602 to the RRC idle mode before the GNSS validity duration expires, based on the message received, at 612, by the NTN 604 prior to the end of the GNSS validity duration. The NTN 604 may cease uplink and/or downlink communication with the UE 602 and transmit, at 616, the RRC release message to the UE 602. The RAN or the core network may trigger the RRC release procedure. The UE 602 may receive, at 616, the RRC release message and switch, at 622, to the RRC idle mode based on the RRC release message.

In further configurations, the UE 602 may switch, at 622, to the RRC idle mode upon expiration of the GNSS validity duration. The UE 602 may switch, at 622, to the RRC idle mode without sending an indication of the switch to the NTN 604 and without receiving, at 616, a release message from the NTN 604. The UE 602 may also delay, at 618, the RRC release procedure based on an inactivity timer or a fixed time (e.g., 1.25 sec.). The delay, at 618, may provide the UE 602 additional time to receive, at 620, a downlink message/information (e.g., pending downlink data, the RRC release message, etc.) but may not be associated with a further uplink transmission of the UE 602. After a certain period of inactivity, the UE 602 may switch, at 622, to the RRC idle mode.

FIG. 7 is a flowchart 700 of a method of wireless communication. The method may be performed by a UE (e.g., the UE 104, 505, 602; the apparatus 1104; etc.), which may include the memory 360 and which may be the entire UE 104, 505, 602 or a component of the UE 104, 505, 602, such as the TX processor 368, the RX processor 356, and/or the controller/processor 359.

At 702, the UE may transmit, to a network entity, a report of a validity duration for GNSS tracking information—the GNSS tracking information is associated with an NTN including the UE and the network entity—the report includes an indication of a remaining time period of the validity duration based on a threshold. For example, referring to FIG. 6, the UE 602 may transmit, at 612, a validity duration report to the NTN 604 based on the validity duration calculated, at 608, for the GNSS tracking information. The transmission, at 702, may be performed by the RRC mode switching component 198.

At 704, the UE may switch to an RRC idle mode based on the report of the validity duration—the RRC idle mode is switched to after an expiration of the remaining time period of the validity duration or based on an RRC release message received from the network entity. For example, referring to FIG. 6, the UE 602 may switch, at 622, to the RRC idle mode based on the validity duration report transmitted, at 612, to the NTN 604 and/or based on the authorization received, at 616, from the NTN 604 to switch to the RRC idle mode. The switch, at 704, may be performed by the RRC mode switching component 198.

FIG. 8 is a flowchart 800 of a method of wireless communication. The method may be performed by a UE (e.g., the UE 104, 505, 602; the apparatus 1104; etc.), which may include the memory 360 and which may be the entire UE 104, 505, 602 or a component of the UE 104, 505, 602, such as the TX processor 368, the RX processor 356, and/or the controller/processor 359.

At 802, the UE may configure a validity index including one or more validity durations for an indication of a remaining time period of the validity duration—a report of the validity duration includes the indication of the remaining time period of the validity duration indicative of the configured validity index. For example, referring to FIG. 6, the UE 602 may configure, at 606, a validity index for generating, at 610, a validity duration report. The configuration, at 802, may be performed by the RRC mode switching component 198.

At 804, the UE may calculate the validity duration for GNSS tracking information. For example, referring to FIG. 6, the UE 602 may calculate, at 608, a validity duration for GNSS tracking information. The calculation, at 804, may be performed by the RRC mode switching component 198.

At 806, the UE may configure the report of the validity duration based on the calculated validity duration entity. For example, referring to FIG. 6, the UE 602 may generate, at 610, a validity duration report based on the validity duration calculated, at 608, for the GNSS tracking information. The configuration, at 806, may be performed by the RRC mode switching component 198. In some aspects, the UE may configure to report to an RRC entity to indicate the validity duration and expiry of the validity duration.

At 808, the UE may encrypt the report of the validity duration including the indication of the remaining time period of the validity duration via an AS message or a NAS message—the report of the validity duration is encrypted prior to being transmitted to the network entity. For example, referring to FIG. 6, the UE 602 may encrypt, at 610, the validity duration report prior to transmitting, at 612, the validity duration report to the NTN 604. The encryption, at 808, may be performed by the RRC mode switching component 198.

At 810, the UE may transmit, to a network entity, a report of a validity duration for GNSS tracking information—the GNSS tracking information is associated with an NTN including the UE and the network entity—the report includes an indication of a remaining time period of the validity duration based on a threshold. For example, referring to FIG. 6, the UE 602 may transmit, at 612, a validity duration report to the NTN 604 based on the validity duration calculated, at 608, for the GNSS tracking information. The transmission, at 810, may be performed by the RRC mode switching component 198.

At 812, the UE may receive, from the network entity or a core network based on the report of the validity duration, an authorization to switch to an RRC idle mode—the UE switches to the RRC idle mode based on the authorization to switch to the RRC idle mode. For example, referring to FIG. 6, the UE 602 may receive, at 616, an authorization from the NTN 604 to switch to the RRC idle mode, such that the UE 602 may switch, at 622, to the RRC idle mode based on the authorization received, at 616, from the NTN 604. The reception, at 812, may be performed by the RRC mode switching component 198.

At 814, the UE may delay the switch to the RRC idle mode after the expiration of the remaining time period of the validity duration based on at least one of an inactivity timer or a fixed time duration. For example, referring to FIG. 6, the UE 602 may delay, at 618, the switch to the RRC idle mode. The delaying, at 814, may be performed by the RRC mode switching component 198.

At 816, the UE may switch to an RRC idle mode based on the report of the validity duration—the RRC idle mode is switched to after an expiration of the remaining time period of the validity duration or based on an RRC release message received from the network entity. For example, referring to FIG. 6, the UE 602 may switch, at 622, to the RRC idle mode based on the validity duration report transmitted, at 612, to the NTN 604 and/or based on the authorization received, at 616, from the NTN 604 to switch to the RRC idle mode. The switching, at 816, may be performed by the RRC mode switching component 198.

FIG. 9 is a flowchart 900 of a method of wireless communication. The method may be performed by a network device (e.g., the network device 103, 410, core network 510, RAN 512, NTN 604; the network entity 1202; etc.), which may include the memory 376 and which may be the entire network device 103, 410, core network 510, RAN 512, NTN 604 or a component of the network device 103, 410, core network 510, RAN 512, NTN 604, such as the TX processor 316, the RX processor 370, and/or the controller/processor 375.

At 902, the network device may receive a report of a validity duration for GNSS tracking information associated with a UE—the GNSS tracking information is associated with an NTN including the network entity and the UE—the report includes an indication of a remaining time period of the validity duration based on a threshold. For example, referring to FIG. 6, the NTN 604 may receive, at 612, a validity duration report from the UE 602 based on the validity duration calculated, at 608, for the GNSS tracking information. The reception, at 902, may be performed by the validity report component 199.

At 904, the network device may configure, based on the report of the validity duration, a second indication of a switch to an RRC idle mode after an expiration of the remaining time period of the validity duration or an RRC release message before the expiration of the remaining time period of the validity duration. For example, referring to FIG. 6, the NTN 604 may transmit, at 620, remaining downlink information to the UE 602 (e.g., after an expiration of a validity timer based on the switch, at 622, to the RRC idle mode being delayed, at 618, by the UE 602. The configuration, at 904, may be performed by the validity report component 199. In some aspects, the network device or base station may configure the UE with the second indication of a switch to an RRC idle mode after an expiration of the remaining time period of the validity duration or an RRC release message before the expiration of the remaining time period of the validity duration. Additionally, the network device or base station may transmit, for the UE, the second indication of a switch to an RRC idle mode after an expiration of the remaining time period of the validity duration or an RRC release message before the expiration of the remaining time period of the validity duration.

FIG. 10 is a flowchart 1000 of a method of wireless communication. The method may be performed by a network device (e.g., the network device 103, 410, core network 510, RAN 512, NTN 604; the network entity 1202; etc.), which may include the memory 376 and which may be the entire network device 103, 410, core network 510, RAN 512, NTN 604 or a component of the network device 103, 410, core network 510, RAN 512, NTN 604, such as the TX processor 316, the RX processor 370, and/or the controller/processor 375.

At 1002, the network device may receive a report of a validity duration for GNSS tracking information associated with a UE—the GNSS tracking information is associated with an NTN including the network entity and the UE—the report includes an indication of a remaining time period of the validity duration based on a threshold. For example, referring to FIG. 6, the NTN 604 may receive, at 612, a validity duration report from the UE 602 based on the validity duration calculated, at 608, for the GNSS tracking information. The reception, at 1002, may be performed by the validity report component 199.

At 1004, the network device may decrypt the report of the validity duration including the indication of the remaining time period of the validity duration—the report of the validity duration is received via an AS message or a NAS message. For example, referring to FIG. 6, the NTN 604 may decrypt, at 614, the validity duration report received, at 612, from the UE 602. The decryption, at 1004, may be performed by the validity report component 199.

At 1006, the network device may transmit, for the UE based on the report of the validity duration, an authorization for the UE to transition to an RRC idle mode. For example, referring to FIG. 6, the NTN 604 may transmit, at 616, an authorization to the UE 602 for the UE 602 to switch to the RRC idle mode based on the validity report received, at 612, from the UE 602. The transmission, at 1006, may be performed by the validity report component 199.

At 1008, the network device may configure, based on the report of the validity duration, a second indication of a switch to an RRC idle mode after an expiration of the remaining time period of the validity duration or an RRC release message before the expiration of the remaining time period of the validity duration. For example, referring to FIG. 6, the NTN 604 may transmit, at 620, remaining downlink information to the UE 602 (e.g., after an expiration of a validity timer based on the switch, at 622, to the RRC idle mode being delayed, at 618, by the UE 602. The configuration, at 1008, may be performed by the validity report component 199.

Figure 11:
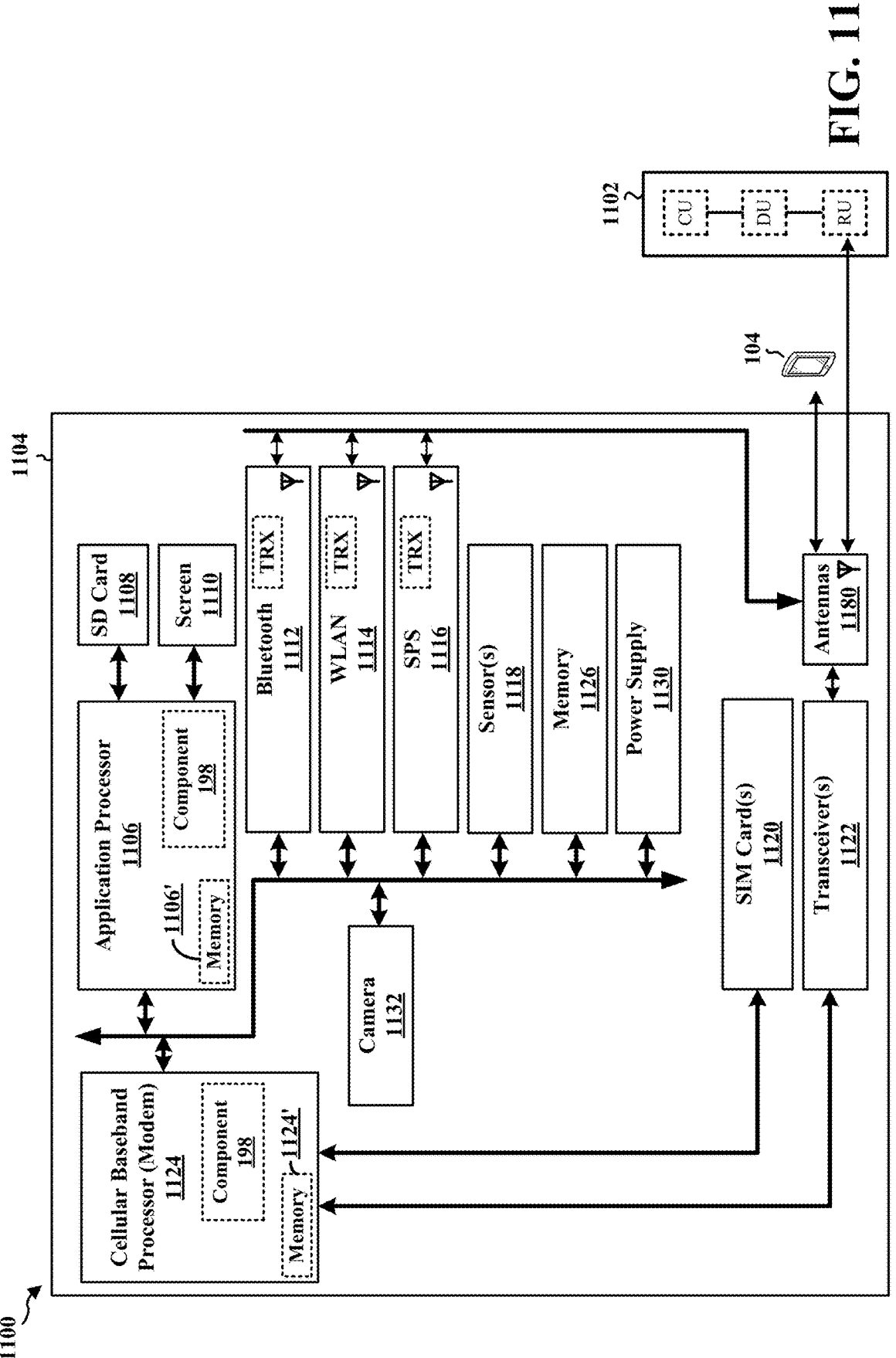
FIG. 11 is a diagram illustrating an example of a hardware implementation for an example apparatus.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, a satellite system module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the satellite system module 1116 may include an on-chip transceiver (TRX)/receiver (RX). The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes cellular baseband processor 1124/application processor 1106 to perform the various functions described herein. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed herein, the radio RRC mode switching component 198 configured to transmit, to a network entity, a report of a validity duration for global navigation satellite system (GNSS) tracking information, the GNSS tracking information being associated with an NTN including the UE and the network entity, the report including an indication of a remaining time period of the validity duration based on a threshold; and switch to an RRC idle mode based on the report of the validity duration, the RRC idle mode being switched to after an expiration of the remaining time period of the validity duration or based on an RRC release message received from the network entity. The radio RRC mode switching component 198 may be within the cellular baseband processor 1124, the application processor 1106, or both the cellular baseband processor 1124 and the application processor 1106. The radio RRC mode switching component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for includes means for transmitting, to a base station, a report of a validity duration for GNSS tracking information, the GNSS tracking information being associated with an NTN including the UE and the network entity, the report including an indication of a remaining time period of the validity duration based on a threshold; and means for switching to an RRC idle mode based on the report of the validity duration, the RRC idle mode being switched to after an expiration of the remaining time period of the validity duration or based on an RRC release message received from the network entity. The apparatus 1104 further includes means for configuring a validity index including one or more validity durations for the indication of the remaining time period of the validity duration, where the report of the validity duration includes the indication of the remaining time period of the validity duration indicative of the configured validity index. The apparatus 1104 further includes means for encrypting the report of the validity duration including the indication of the remaining time period of the validity duration via an AS message or a NAS message, where the report of the validity duration is encrypted prior to being transmitted to network entity. The apparatus 1104 further includes means for receiving, from the network entity or a core network based on the report of the validity duration, an authorization to switch to the RRC idle mode, where the UE switches to the RRC idle mode based on the authorization to switch to the RRC idle mode. The apparatus 1104 further includes means for delaying the switch to the RRC idle mode after the expiration of the remaining time period of the validity duration based on at least one of an inactivity timer or a fixed time duration. The apparatus 1104 further includes means for calculating the validity duration for the GNSS tracking information; and means for configuring the report of the validity duration based on the calculated validity duration and at least one RRC entity. The means may be the radio RRC mode switching component 198 of the apparatus 1104 configured to perform the functions recited by the means. As described herein, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
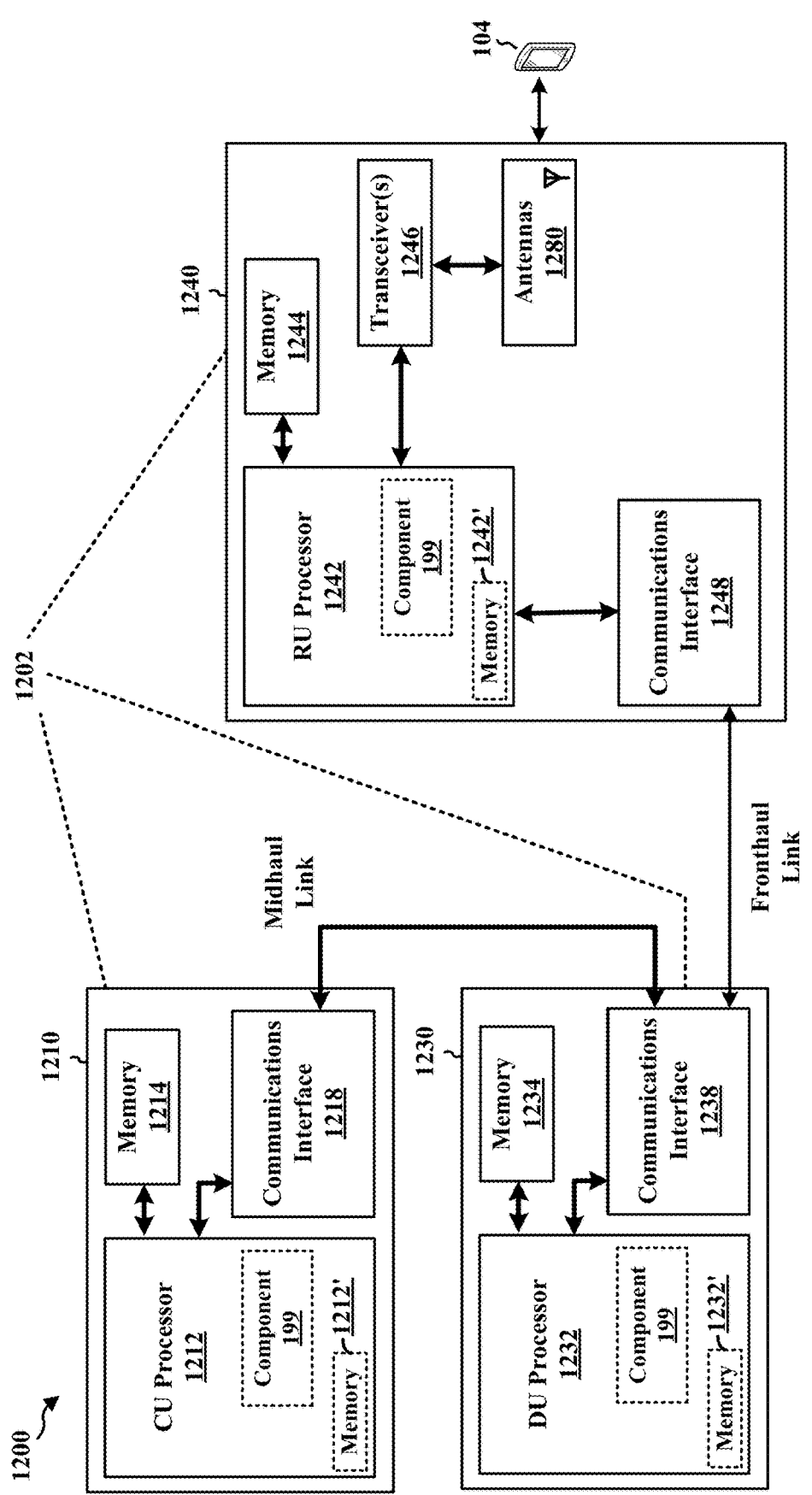
FIG. 12 is a diagram illustrating an example of a hardware implementation for an example apparatus.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the validity report component 199 configured to receive a report of a validity duration for GNSS tracking information associated with a UE, the GNSS tracking information being associated with an NTN including the network entity and the UE, the report including an indication of a remaining time period of the validity duration based on a threshold; and configure, based on the report of the validity duration, a second indication of a switch to an RRC idle mode after an expiration of the remaining time period of the validity duration or an RRC release message before the expiration of the remaining time period of the validity duration. The validity report component 199 may be within one or more processors of one or more of the CU 1210, DU 1230, and the RU 1240. The validity report component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for receiving a report of a validity duration for GNSS tracking information associated with a UE, the GNSS tracking information being associated with an NTN including the network entity and the UE, the report including an indication of a remaining time period of the validity duration based on a threshold; and means for configuring, based on the report of the validity duration, a second indication of a switch to an RRC idle mode after an expiration of the remaining time period of the validity duration or an RRC release message before the expiration of the remaining time period of the validity duration. The network entity 1202 further includes means for decrypting the report of the validity duration including the indication of the remaining time period of the validity duration, where the report of the validity duration is received via an AS message or a NAS message. The network entity 1202 further includes means for transmitting, for the UE based on the report of the validity duration, an authorization for the UE to transition to the RRC idle mode. The means may be the validity report component 199 of the network entity 1202 configured to perform the functions recited by the means. As described herein, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication at a UE including at least one processor coupled to a memory and configured to transmit, to a network entity, a report of a validity duration for GNSS tracking information, the GNSS tracking information being associated with an NTN including the UE and the network entity, the report including an indication of a remaining time period of the validity duration based on a threshold; and switch to an RRC idle mode based on the report of the validity duration, the RRC idle mode being switched to after an expiration of the remaining time period of the validity duration or based on an RRC release message received from the network entity.

Aspect 2 may be combined with aspect 1 and includes that the report of the validity duration is indicative of at least one of a validity index associated with one or more predefined validity durations or a reference point associated with a starting time of the validity duration.

Aspect 3 may be combined with any of aspects 1-2 and includes that the reference point is associated with an SFN and the validity index is a closest validity index to the reference point.

Aspect 4 may be combined with any of aspects 1-3 and includes that the at least one processor is further configured to configure a validity index including one or more validity durations for the indication of the remaining time period of the validity duration, where the report of the validity duration includes the indication of the remaining time period of the validity duration indicative of the configured validity index.

Aspect 5 may be combined with any of aspects 1-4 and includes that the report of the validity duration is transmitted to the network entity based on an output of a timing function indicative of the remaining time period of the validity duration.

Aspect 6 may be combined with any of aspects 1-5 and includes that the report of the validity duration is transmitted to the network entity if the remaining time period of the validity duration crosses the threshold.

Aspect 7 may be combined with any of aspects 1-6 and includes that the threshold corresponds to a configuration of the validity duration, and where a MAC-CE is triggered to indicate that the threshold is crossed based on the configuration of the validity duration.

Aspect 8 may be combined with any of aspects 1-7 and includes that the report of the validity duration including the indication of the remaining time period of the validity duration is transmitted to the network entity via an RRC message or a MAC-CE.

Aspect 9 may be combined with any of aspects 1-8 and includes that the at least one processor is further configured to encrypt the report of the validity duration including the indication of the remaining time period of the validity duration via an AS message or a NAS message, where the report of the validity duration is encrypted prior to being transmitted to the network entity.

Aspect 10 may be combined with any of aspects 1-9 and includes that the UE autonomously switches to the RRC idle mode based on the report of the validity duration.

Aspect 11 may be combined with any of aspects 1-10 and includes that the at least one processor is further configured to receive, from the network entity or a core network based on the report of the validity duration, an authorization to switch to the RRC idle mode, where the UE switches to the RRC idle mode based on the authorization to switch to the RRC idle mode.

Aspect 12 may be combined with any of aspects 1-11 and includes that the at least one processor is further configured to delay the switch to the RRC idle mode after the expiration of the remaining time period of the validity duration based on at least one of an inactivity timer or a fixed time duration.

Aspect 13 may be combined with any of aspects 1-12 and includes that the at least one processor is further configured to calculate the validity duration for the GNSS tracking information; and configure the report of the validity duration based on the calculated validity duration and at least one RRC entity.

Aspect 14 is an apparatus for wireless communication at a base station including at least one processor coupled to a memory and configured to receive a report of a validity duration for GNSS tracking information associated with a UE, the GNSS tracking information being associated with an NTN including the network entity and the UE, the report including an indication of a remaining time period of the validity duration based on a threshold; and configure, based on the report of the validity duration, a second indication of a switch to an RRC idle mode after an expiration of the remaining time period of the validity duration or an RRC release message before the expiration of the remaining time period of the validity duration.

Aspect 15 may be combined with aspect 14 and includes that the report of the validity duration is indicative of at least one of a validity index associated with one or more predefined validity durations or a reference point associated with a starting time of the validity duration.

Aspect 16 may be combined with any of aspects 14-15 and includes that the reference point is associated with an SFN and the validity index is a closest validity index to the reference point.

Aspect 17 may be combined with any of aspects 14-16 and includes that the report of the validity duration is associated with a configured validity index including one or more validity durations for the indication of the remaining time period of the validity duration, where the report of the validity duration includes the indication of the remaining time period of the validity duration indicative of the configured validity index.

Aspect 18 may be combined with any of aspects 14-17 and includes that the report of the validity duration received is associated with a timing function output indicative of the remaining time period of the validity duration.

Aspect 19 may be combined with any of aspects 14-18 and includes that the report of the validity duration is received if the remaining time period of the validity duration crosses the threshold.

Aspect 20 may be combined with any of aspects 14-19 and includes that the threshold corresponds to a configuration of the validity duration, and where a MAC-CE is triggered to indicate that the threshold is crossed based on the configuration of the validity duration.

Aspect 21 may be combined with any of aspects 14-20 and includes that the report of the validity duration including the indication of the remaining time period of the validity duration is received via an RRC message or a MAC-CE.

Aspect 22 may be combined with any of aspects 14-21 and includes that the at least one processor is further configured to decrypt the report of the validity duration including the indication of the remaining time period of the validity duration, where the report of the validity duration is received via an AS message or a NAS message.

Aspect 23 may be combined with any of aspects 14-22 and includes that the at least one processor is further configured to transmit, for the UE based on the report of the validity duration, an authorization for the UE to transition to the RRC idle mode.

Aspect 24 may be combined with any of aspects 14-23 and includes that the switch to the RRC idle mode is delayed after the expiration of the remaining time period of the validity duration based on at least one of an inactivity timer or a fixed time duration.

Aspect 25 may be combined with any of aspects 1-24 and further includes at least one of an antenna or a transceiver coupled to the at least one processor.

Aspect 26 is a method of wireless communication for implementing any of aspects 1-25.

Aspect 27 is an apparatus for wireless communication including means for implementing any of aspects 1-25.

Aspect 28 is a non-transitory computer-readable medium storing computer executable code, the code when executed by at least one processor causes the at least one processor to implement any of aspects 1-25.

What is claimed is:

1. An apparatus for wireless communication at a user equipment (UE), comprising:
   memory; and
   at least one processor coupled to the memory and configured to:
      transmit, to a network entity, a report of a validity duration for global navigation satellite system (GNSS) tracking information, the GNSS tracking information being associated with a non-terrestrial network (NTN) including the UE and the network entity, the report including an indication of a remaining time period of the validity duration;
      receive, from the network entity or a core network, an authorization to switch to a radio resource control (RRC) idle mode based on the remaining time period of the validity duration; and
      switch to the RRC idle mode based on the received authorization to switch to the RRC idle mode based on the remaining time period of the validity duration, the RRC idle mode being switched to after an expiration of the remaining time period of the validity duration.

2. The apparatus of claim 1, wherein the indication comprises a first indication of a validity index associated with one or more predefined validity durations and a second indication of a reference point associated with a starting time of the validity duration.

3. The apparatus of claim 2, wherein the reference point comprises a system frame number (SFN) and the validity index is a closest validity index to the SFN.

4. The apparatus of claim 1, wherein the at least one processor is further configured to:

configure a validity index including one or more validity durations for the indication of the remaining time period of the validity duration, wherein the report of the validity duration includes the indication of the remaining time period of the validity duration indicative of the configured validity index.

5. The apparatus of claim 1, wherein the remaining time period of the validity duration is based on an output of a timing function indicative of the remaining time period of the validity duration.

6. The apparatus of claim 1, wherein, to transmit the report, the at least one processor is configured to:

transmit the report if the remaining time period of the validity duration crosses a threshold.

7. The apparatus of claim 6, wherein the threshold corresponds to a configuration of the validity duration, wherein, to transmit the report, the at least one processor is configured to:

transmit a medium access control (MAC)-control element (MAC-CE) comprising the report to indicate that the threshold is crossed based on the configuration of the validity duration.

8. The apparatus of claim 1, wherein to transmit the report, the at least one processor is configured to:

transmit an RRC message or a medium access control (MAC)-control element (MAC-CE) comprising the report.

9. The apparatus of claim 1, wherein the at least one processor is further configured to:

encrypt the report of the validity duration including the indication of the remaining time period of the validity duration via an access stratum (AS) message or a non-access stratum (NAS) message, wherein the report of the validity duration is encrypted prior to being transmitted to the network entity.

10. The apparatus of claim 1, wherein the UE autonomously switches to the RRC idle mode based on the report of the validity duration.

11. The apparatus of claim 1, wherein the at least one processor is further configured to:

delay the switch to the RRC idle mode after the expiration of the remaining time period of the validity duration based on at least one of an inactivity timer or a fixed time duration.

12. The apparatus of claim 1, further comprising at least one of an antenna or a transceiver coupled to the at least one processor, wherein the at least one processor is further configured to:

calculate the validity duration for the GNSS tracking information;

configure the report of the validity duration based on the calculated validity duration; and transmit, via at least one of the antenna or the transceiver, the report to a radio resource control (RRC) entity to indicate the validity duration and expiry of the validity duration.

13. An apparatus for wireless communication at a network entity, comprising:

memory; and at least one processor coupled to the memory and configured to:

receive a report of a validity duration for global navigation satellite system (GNSS) tracking information associated with a user equipment (UE), the GNSS tracking information being associated with a non-terrestrial network (NTN) including the network entity and the UE, the report including an indication of a remaining time period of the validity duration;

configure, based on the report of the validity duration, a switch to a radio resource control (RRC) idle mode after an expiration of the remaining time period of the validity duration; and transmit an authorization for the UE to switch to the RRC idle mode based on the configured switch.

14. The apparatus of claim 13, wherein the indication comprises a first indication of a validity index associated with one or more predefined validity durations and a second indication of a reference point associated with a starting time of the validity duration.

15. The apparatus of claim 14, wherein the reference point comprises a system frame number (SFN) and the validity index is a closest validity index to the SFN, wherein the at least one processor is further configured to:

determine the remaining time period based on the SFN and the validity index.

16. The apparatus of claim 13, wherein the report of the validity duration is associated with a configured validity index including one or more validity durations for the indication of the remaining time period of the validity duration, wherein the report of the validity duration includes the indication of the remaining time period of the validity duration indicative of the configured validity index.

17. The apparatus of claim 13, wherein the remaining time period of the validity duration is based on an output of a timing function indicative of the remaining time period of the validity duration.

18. The apparatus of claim 13, wherein, to receive the report, the at least one processor is configured to:

receive the report if the remaining time period of the validity duration crosses a threshold.

19. The apparatus of claim 18, wherein the threshold corresponds to a configuration of the validity duration, wherein to receive the report, the at least one processor is configured to:

receive a medium access control (MAC)-control element (MAC-CE) comprising the report based on the configuration of the validity duration.

20. The apparatus of claim 13, wherein, to receive the report based on the remaining time period of the validity duration being less than a threshold, the at least one processor is configured to:

receive an RRC message or a medium access control (MAC)-control element (MAC-CE) comprising the report.

21. The apparatus of claim 13, wherein the at least one processor is further configured to:

decrypt the report of the validity duration including the indication of the remaining time period of the validity duration, wherein the report of the validity duration is received via an access stratum (AS) message or a non-access stratum (NAS) message.

22. The apparatus of claim 13, further comprising at least one of an antenna or a transceiver coupled to the at least one processor, wherein the at least one processor is further configured to:

transmit, for the UE based on the report of the validity duration, via at least one of the antenna or the transceiver, the authorization for the UE to transition to the RRC idle mode.

23. The apparatus of claim 13, wherein the switch to the RRC idle mode is delayed after the expiration of the remaining time period of the validity duration based on at least one of an inactivity timer or a fixed time duration.

24. A method of wireless communication at a user equipment (UE), comprising:

transmitting, to a network entity, a report of a validity duration for global navigation satellite system (GNSS) tracking information, the GNSS tracking information being associated with a non-terrestrial network (NTN) including the UE and the network entity, the report including an indication of a remaining time period of the validity duration;

receiving, from the network entity or a core network, an authorization to switch to a radio resource control (RRC) idle mode based on the remaining time period of the validity duration; and switching to the RRC idle mode based on the received authorization to switch to the RRC idle mode based on the remaining time period of the validity duration, the RRC idle mode being switched to after an expiration of the remaining time period of the validity duration.

25. The method of claim 24, wherein the indication comprises a first indication of a validity index associated with one or more predefined validity durations and a second indication of a reference point associated with a starting time of the validity duration.

26. The method of claim 25, wherein the reference point comprises a system frame number (SFN) and the validity index is a closest validity index to the SFN.

27. The method of claim 24, further comprising:

configuring a validity index including one or more validity durations for the indication of the remaining time period of the validity duration, wherein the report of the validity duration includes the indication of the remaining time period of the validity duration indicative of the configured validity index.

28. The method of claim 24, wherein the remaining time period of the validity duration is based on an output of a timing function indicative of the remaining time period of the validity duration.

29. A method of wireless communication at a network entity, comprising:

receiving a report of a validity duration for global navigation satellite system (GNSS) tracking information associated with a user equipment (UE), the GNSS tracking information being associated with a non-terrestrial network (NTN) including the network entity and the UE, the report including an indication of a remaining time period of the validity duration;

configuring, based on the report of the validity duration, a switch to a radio resource control (RRC) idle mode after an expiration of the remaining time period of the validity duration; and transmitting an authorization for the UE to switch to the RRC idle mode based on the configured switch.

* * * * *